US012361023B2

(12) United States Patent
Upadhyay et al.

(10) Patent No.: US 12,361,023 B2
(45) Date of Patent: Jul. 15, 2025

(54) TECHNIQUES FOR SOURCE-SIDE METADATA ENRICHMENT

(71) Applicant: Rubrik, Inc., Palo Alto, CA (US)

(72) Inventors: Dhawal Upadhyay, Bangalore (IN); Shubham Tagra, Bangalore (IN); Akhilesh Krishnan, Sunnyvale, CA (US); Vijay Karthik, Santa Clara, CA (US); Akshay Agrawal, Bangalore (IN)

(73) Assignee: Rubrik, Inc., Palo Alto, CA (US)

( * ) Notice: Subject to any disclaimer, the term of this patent is extended or adjusted under 35 U.S.C. 154(b) by 58 days.

(21) Appl. No.: 18/205,450

(22) Filed: Jun. 2, 2023

(65) Prior Publication Data

US 2024/0403324 A1    Dec. 5, 2024

(51) Int. Cl.
*G06F 16/27* (2019.01)
*G06F 16/215* (2019.01)

(52) U.S. Cl.
CPC .......... *G06F 16/278* (2019.01); *G06F 16/215* (2019.01); *G06F 16/273* (2019.01)

(58) Field of Classification Search
CPC ..... G06F 16/278; G06F 16/273; G06F 16/215
USPC ........................................................ 707/616
See application file for complete search history.

(56) References Cited

U.S. PATENT DOCUMENTS

| | | | |
|---|---|---|---|
| 11,022,239 B1* | 6/2021 | Faison | F16L 3/1215 |
| 2017/0344592 A1* | 11/2017 | Sundaram | G06F 16/273 |
| 2020/0026711 A1* | 1/2020 | Blom | H04L 67/565 |

* cited by examiner

*Primary Examiner* — Kimberly L Wilson
(74) *Attorney, Agent, or Firm* — Holland & Hart LLP

(57) ABSTRACT

Methods, systems, and devices for data management are described. A data enrichment service supported by a data management system (DMS) may receive, from a first application in a destination computing environment of the DMS, a set of enrichment definitions for metadata synchronization between the first application and a second application in a source computing environment of the DMS. A change data capture (CDC) service supported by the DMS may generate a set of data records that correspond to metadata changes associated with the second application. The data enrichment service may transform the set of data records by using data enrichment components to modify the set of data records according to the set of enrichment definitions provided by the first application. The data enrichment components may be dynamically partitioned into groups that execute in parallel. The second application may push the enriched data records to the first application in real-time.

20 Claims, 10 Drawing Sheets

TECHNIQUES FOR SOURCE-SIDE METADATA ENRICHMENT

FIELD OF TECHNOLOGY

The present disclosure relates generally to data management, including techniques for techniques for source-side metadata enrichment.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Figure 1:
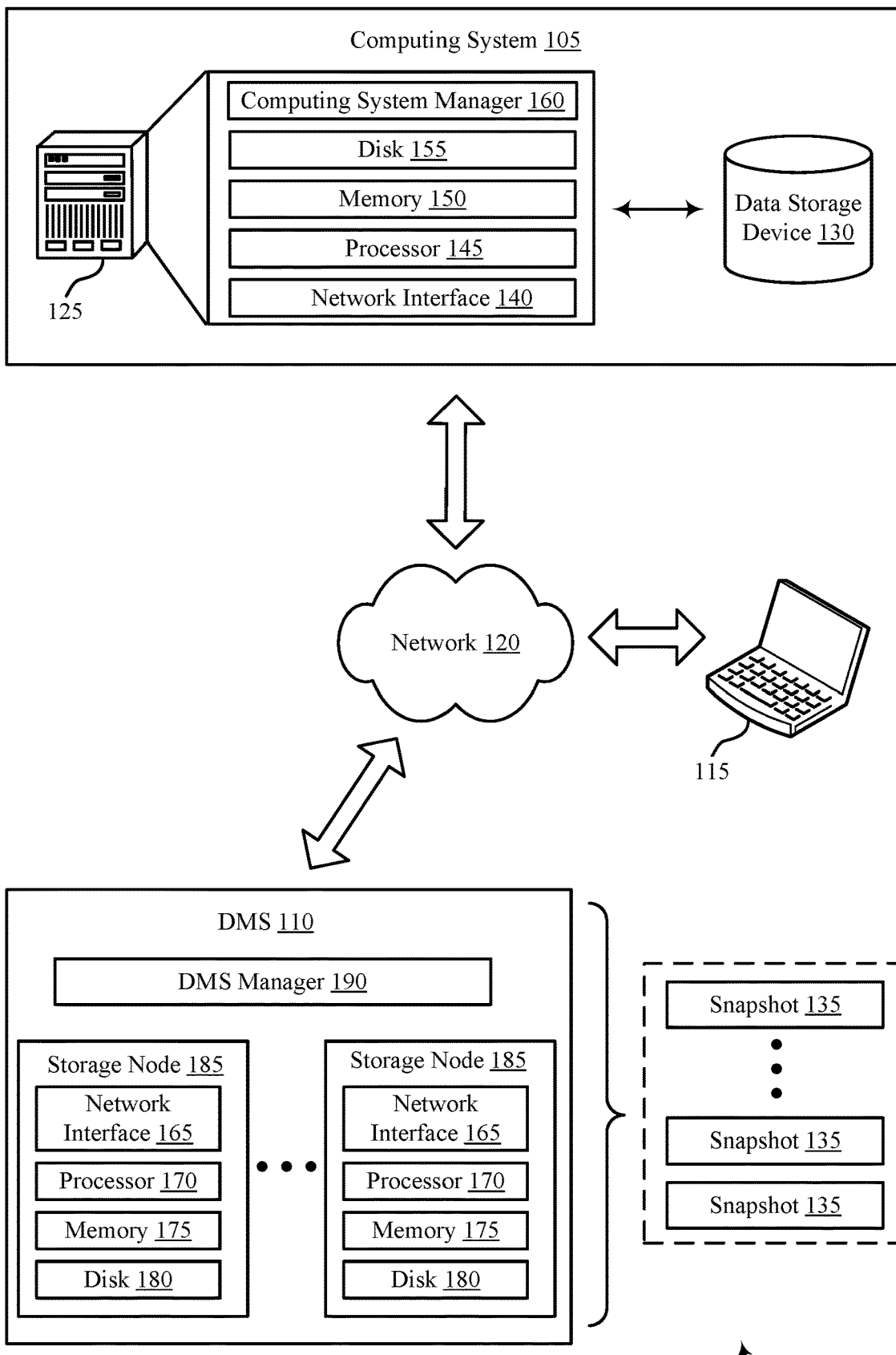
FIG. 1 illustrates an example of a computing environment that supports techniques for source-side metadata enrichment in accordance with aspects of the present disclosure.

A data management system (DMS) may include various distributed nodes or node clusters that provide backup and recovery services for client systems. Some backup processes within the DMS may involve exchanging metadata between applications running in different data centers or cloud environments. For example, an application running in a source computing environment (referred to hereinafter as the source) may push metadata to an application running in a destination computing environment (referred to hereinafter as the destination) such that the metadata is synchronized across the source and the destination. The destination may use the metadata provided by the source to perform various tasks related to database backup, recovery, duplication, restoration, etc.

In some cases, to reduce the volume of information that is transferred from the source to the destination, the source may identify which rows (i.e., within a table that includes metadata associated with the source) have changed since the last exchange, and may push the changed rows to the destination via data records that are processed and stored at the destination. If, however, the content or format of data records stored in the source computing environment differs from the content or format in which the destination expects to receive data records, the destination may be unable to properly ingest data records from the source. For example, the destination may need additional (i.e., auxiliary) data from the source to process a given data record, and this data may not be readily available to the destination.

Aspects of the present disclosure support techniques for using source-side data enrichment to maintain consistency across the source and the destination. Source-side enrichment generally refers to the process of filtering, modifying, and/or augmenting data records at the source so the data records can be ingested (e.g., without additional processing) at the destination. Some forms of data enrichment (referred to hereinafter as projection enrichments) may involve retaining or discarding certain fields from a data record. Other forms of data enrichment (referred to hereinafter as structured query language (SQL) enrichments) may involve executing SQL queries configured by the destination.

Some other forms of data enrichment (referred to hereinafter as programmatic enrichments) may involve calling external services and systems via an application programming interface (API) or a remote procedure call (RPC). The various data enrichment operations described herein may be performed by modules or components of the source (referred to hereinafter as enrichers or data enrichment components). Some forms of data enrichment (e.g., programmatic enrichments) may take longer to complete than other forms of data enrichment (e.g., projection enrichments). To account for differences in latency, enrichers with similar processing times may be dynamically partitioned into groups that run concurrently.

Particular aspects of the subject matter described in this disclosure can be implemented to realize one or more of the following potential advantages. In some examples, by filtering and enriching data records at the source (e.g., within the source computing environment), the described techniques may result in lower signaling overhead, reduced latency, fewer consistency issues, etc. For example, instead of pushing raw (i.e., untransformed) data records to the destination and having the destination request auxiliary data that it needs to process or otherwise ingest the data records, the source may proactively enrich the data records according to a set of declarative enrichment definitions provided by the destination, thereby avoiding the latency and signaling overhead associated with transferring additional/auxiliary data to the destination.

FIG. 1 illustrates an example of a computing environment 100 that supports techniques for source-side metadata enrichment in accordance with aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may include a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, at least one processor 145, at least one memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The at least one processor 145 may execute computer-readable instructions stored in the at least one memory 150 in order to cause the server 125 to perform functions ascribed herein to the server 125. The at least one processor 145 may include one or more processing units, such as one or more central processing units (CPUs), one or more graphics processing units (GPUs), or any combination thereof. The at least one memory 150 may include one or more types of memory (e.g., random access memory (RAM), static random access memory (SRAM), dynamic random access memory (DRAM), read-only memory ((ROM), electrically erasable programmable read-only memory (EEPROM), Flash, etc.).

Disk 155 may include one or more HDDs, one or more SSDs, or any combination thereof. Memory 150 and disk 155 may include hardware storage devices. The computing system manager 160 may manage the computing system 105 or aspects thereof (e.g., based on instructions stored in the at least one memory 150 and executed by the at least one processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, where shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure.

The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the at least one memory, the at least one processor 145, the network interface 140, the data storage device 130, or any combination thereof in support of running the various applications. Storage resources (e.g., the disk 155, the at least one memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, at least one processor 170, at least one memory 175, and disks 180. The network interfaces 165 may enable the storage nodes 185 to connect to one another, to the network 120, or both. A network interface 165 may include one or more wireless network interfaces, one or more wired network interfaces, or any combination thereof. The at least one processor 170 of a storage node 185 may execute computer-readable instructions stored in the at least one memory 175 of the storage node 185 in order to cause the storage node 185 to perform processes described herein as performed by the storage node 185. At least one processor 170 may include one or more processing units, such as one or more CPUs, one or more GPUs, or any combination thereof. The at least one memory 150 may include one or more types of memory (e.g., RAM, SRAM, DRAM, ROM, EEPROM, Flash, etc.). A disk 180 may include one or more HDDs, one or more SSDs, or any combination thereof. Memories 175 and disks 180 may include hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable.

Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190) may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160) may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time).

Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state-which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In accordance with the techniques described herein, a data enrichment service supported by the DMS 110 may receive, from a first application in a destination computing environment of the DMS 110, a set of enrichment definitions for metadata synchronization between the first application and a second application in a source computing environment of the DMS 110. A change data capture (CDC) service supported by the DMS 110 may provide, to the data enrichment service, a set of data records corresponding to metadata changes associated with the second application. Accordingly, the data enrichment service may transform the set of data records by using a set of data enrichment components to modify the set of data records according to the set of enrichment definitions provided by the first application, where the set of data enrichment components are dynamically partitioned into enrichment groups that execute in parallel. The second application may push the transformed data records to the first application via a real-time CDC stream.

Figure 2:
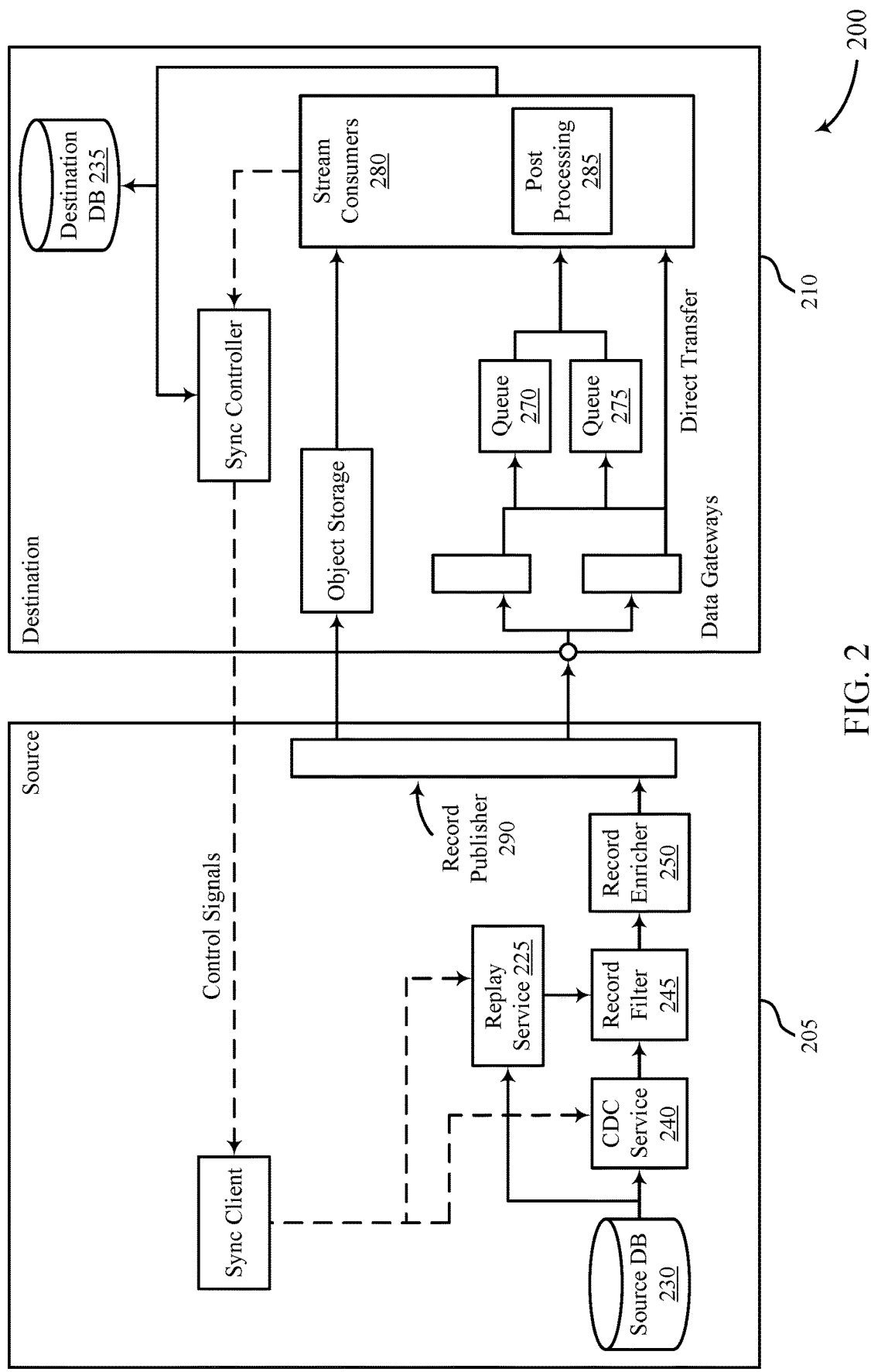
FIGS. 2 and 3 show examples of system diagrams that supports techniques for source-side metadata enrichment in accordance with aspects of the present disclosure.

FIG. 2 shows an example of a system diagram 200 that supports techniques for source-side metadata enrichment in accordance with aspects of the present disclosure. The system diagram 200 may implement or be implemented by aspects of the computing environment 100. For example, the system diagram 200 includes a source computing environment 205 and a destination computing environment 210, which may be examples of logical and/or physical subsystems of the DMS 110 described with reference to FIG. 1. In the example of FIG. 2, a set of data records corresponding to metadata changes associated with an application in the source computing environment 205 may be enriched (i.e., transformed) and pushed to an application in the destination computing environment 210.

As described herein, applications supported by the DMS 110 may run (i.e., be executed) across multiple data centers and cloud environments. To access metadata of applications running in a different environment, the data can either be fetched synchronously or cached locally. Caching the metadata of an application running in a different environment locally may have performance advantages. Post-processing 285 can also be used when there are changes to data in the local cache. Caching can either be pull-based, where data from each data center is pulled periodically, or push-based, where data centers push changes as they occur. A pull-based model may, in some cases, result in staleness of data up to the polling interval. Hence, a push-based model that can synchronize changes in near real-time (NRT) may be desirable in some deployments.

The system diagram 200 illustrates an example of a push-based NRT mechanism that supports metadata synchronization across applications running in different data centers or cloud environments. The techniques described with reference to FIG. 2 also support mechanisms for ensuring that updates, inserts, and deletes are synchronized from the source computing environment 205 to the destination computing environment 210. Aspects of the present disclosure may enable an application running in the source computing environment (referred to hereinafter as the source) to filter out some data records and enrich the data records before they are sent to an application running in the destination computing environment (referred to hereinafter as the destination). The described techniques may also ensure that a row does not roll back in time, even with clock jumps. The scheme depicted in the example of FIG. 2 may enable applications to detect and recover from synchronization backlogs.

The system diagram 200 supports techniques for synchronizing metadata changes in NRT from any number of metadata sources in a performant and scalable manner. The system diagram 200 also supports techniques for identifying and processing data additions, updates, and deletions. In addition, the techniques described with reference to FIG. 2 support filtering and enrichment of data by sources before the data is pushed to the destination. The system diagram 200 may further support different priorities and isolation among data streams. The described techniques may ensure that a row does not roll back in time, even if there are clock skews between the source and the destination. Aspects of the present disclosure may also support automatic detection and recovery of synchronization backlogs.

As described herein, the system diagram 200 illustrates an example of a push-based NRT mechanism to synchronize metadata between the source and the destination. Multiple sources can be supported for a single destination. The described techniques leverage CDC techniques at source databases to track insert/update/delete operations in metadata tables. Each CDC record may be published to the destination (via the publisher 290) and stored (by stream consumers 280) in the destination database 235.

The destination can push configuration information, such as when to start/stop pushing data, or any filtering to be done on the data, to the source. The destination may, in some examples, want to filter out some changes at the source. To avoid transmitting and/or processing extraneous data, the destination can provide filter conditions to the source. A particular class of updates can be dropped by the record filter 245. The record filter 245 may support at least two types of filtering, namely, relevant column filtering and SQL filtering. For a relevant column filter, the record filter 245 may selectively propagate a row if certain columns have changed. For a SQL filter, the record filter 245 may propagate a row if the row matches a given SQL statement.

The records can also be transformed by the source before they are sent to the destination. For example, an "event" record can be enriched with information about the object associated with the event. The data enrichment service 250 (also referred to herein as a record enricher service) may support different types of enrichments, such as projection enrichments, transformation enrichments, and additive enrichments. For projection enrichments, the destination may select a subset of columns from a table. For transformation enrichments, the value of a column may be transformed by applying a function to the column. This function could take other columns from the same data record. For additive enrichments, poll channels may create a resultant record by combining data from multiple tables and adding data that is generated programmatically. In some examples, a consistent data view across multiple tables can be obtained using time-travel functions of the source that leverage multi-version concurrency control (MVCC), such as "AS OF SYSTEM TIME" for queries in CockroachDB. In other examples, a consistent data view against the latest state of the source can be obtained (e.g., to retrieve the value of a row at the time of a CDC record) even if time-travel functionality is unavailable.

In some implementations, each record generated by the CDC service 240 goes to the record filter 245, where some records may be dropped. The filtering may involve inspecting the CDC records. After filtering, the CDC records pass through different enrichers (i.e., the data enrichment service 250), where they are transformed. Some enrichment operations may be faster than others. As such, there may be several enricher groups, depending on the latency of each enricher. After record enrichment is complete, the CDC records are sent to the destination, where they are stored in a queue 270. There can be multiple publishers running in parallel. As such, data records may sometimes be published in an order that is different from the order in which they were generated.

The destination may use queues to make consumers 280 and producers independently scalable. There can be one queue for each data source to provide better isolation and prioritization. For example, if a source sends a relatively large number of updates, the influx of data records may not adversely affect the consumption/intake of other sources, as every source has a respective queue. In some implementations, there may be consumer workers listening to each queue responsible for storing updates in the destination database 235. The number of workers for any queue can be configurable to provide higher or lower priority for data sources. Each row in the source may have an update timestamp. Each row in the queue 270 may be parsed, and checks may be performed to determine if a row needs to be updated in the destination.

If the operation type is insert and the row does not exist in the destination, the row may be inserted into the destination database 235. If the operation type is update and the row does not exist in the destination, the row may also be inserted into the destination database 235. Otherwise, if the row exists, the row may be updated if the update time of the row is newer than that of the destination. If the operation type is delete, the row is deleted from the destination database 235 if the update time of the row is newer than that of the destination.

If a data source is delayed in pushing updates, the resulting backlog can be detected at the destination using "checkpoints". For example, the CDC service 240 may send checkpoints for a table at recurring intervals to indicate that all data up to a point in time has been sent for that table. Checkpoints may be sent regardless of whether records are published. The destination may keep track of all checkpoints consumed for a given source. If the latest checkpoint is older than some threshold (e.g., 5 mins), the destination may infer that the source is backlogged. If a backlog is detected at a source, the destination can trigger a "Replay" operation to recover from the backlog, as described herein. The asynchronous metadata service 225 may help resolve the backlog by publishing rows directly from the source database 230) (bypassing the CDC service 240).

In accordance with the techniques described herein, a data enrichment service 250) may receive, from a first application in the destination computing environment 210, a set of enrichment definitions for metadata synchronization between the first application and a second application in the source computing environment 205. The CDC service 240 may provide, to the data enrichment service 250, a set of data records (i.e., CDC records) corresponding to metadata changes associated with the second application. Accordingly, the data enrichment service 250 may transform the set of data records by using a set of data enrichment components to modify the set of data records according to the set of enrichment definitions provided by the first application, where the set of data enrichment components are dynamically partitioned into enrichment groups that execute in parallel. The second application may push the transformed data records to the first application via a real-time CDC stream.

Figure 3:
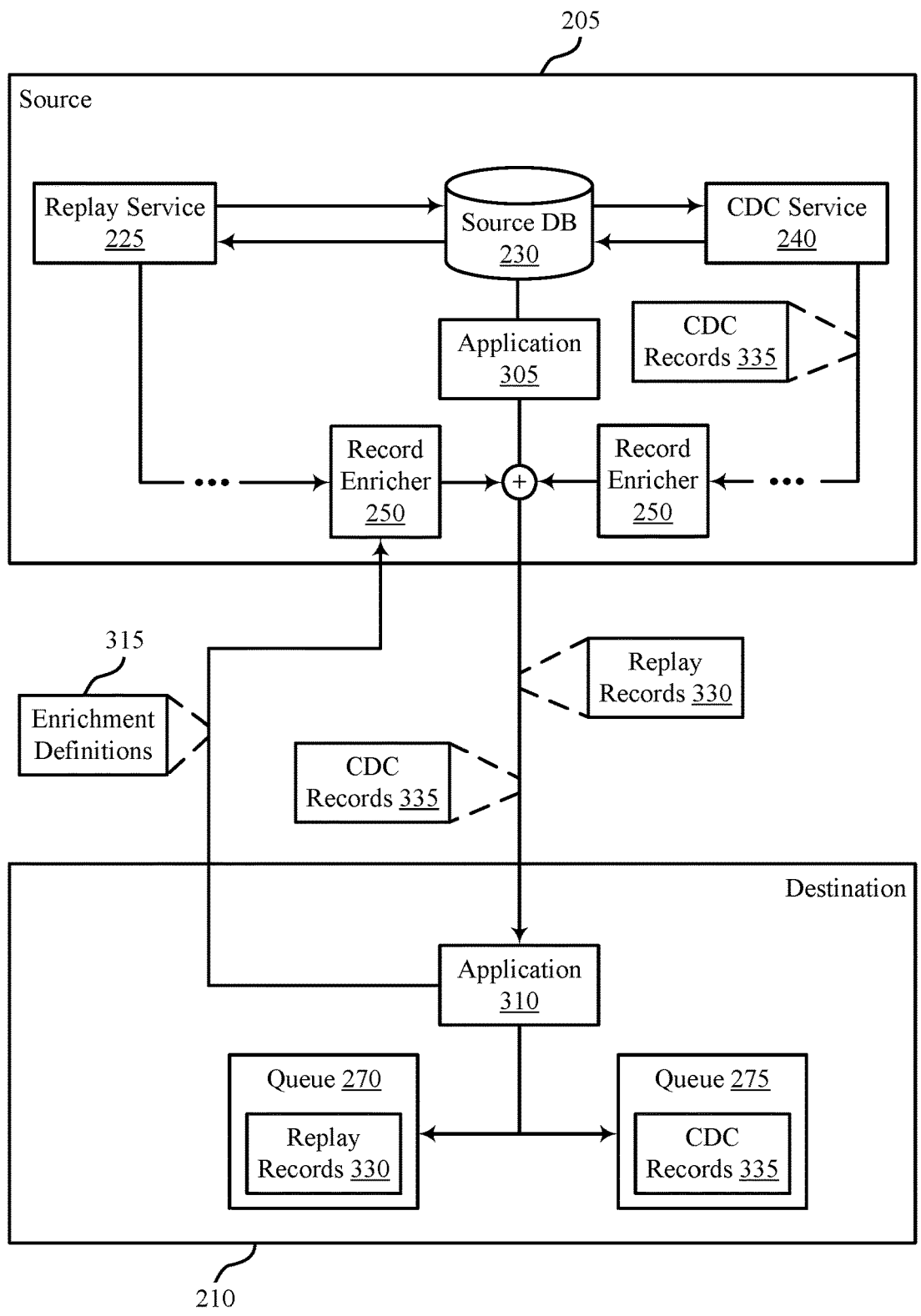

FIG. 3 shows an example of a system diagram 300 that supports techniques for source-side metadata enrichment in accordance with aspects of the present disclosure. The system diagram 300 may implement or be implemented by aspects of the computing environment 100 or the system diagram 200, as described with reference to FIGS. 1 and 2. For example, the system diagram 300 includes the source computing environment 205 and the destination computing environment 210, which may be examples of different logical and/or physical sub-systems of the DMS 110, as described with reference to FIGS. 1 and 2. In the example of FIG. 3, replay records 330 and CDC records 335 may be pushed from an application 305 in the source computing environment 205 (referred to hereinafter as the source) to an application 310 in the destination computing environment 210) (referred to hereinafter as the destination) via one or more data streams.

Aspects of the present disclosure may leverage CDC to track updates to tables and push them to the destination. In such a model, where incremental updates are pushed to the destination, there can be situations where processing all updates would be computationally infeasible. For example, there may be a large backlog of updates that the destination is unable to process. The techniques described herein support a faster bulk-push approach that can be used to push the latest version of data from the source. An asynchronous metadata stream (equivalently referred to as a replay stream or a second data stream) may result in less data being transferred/pushed in comparison to a corresponding CDC stream (also referred to as an NRT stream or a first data stream), as the asynchronous metadata service 225 may only push the latest version, thereby reducing the processing time and system load.

The asynchronous metadata retrieval techniques described herein can be used in combination with other NRT synchronization approaches, and can be used to recover from a backlog in a CDC stream, initialize new data sources, or send data periodically when real-time synchronization is not required. The described techniques also ensure that updates, inserts, and deletes are synchronized from the source to the destination during a replay stream. Aspects of the present disclosure may further enable the source to filter out some records and enrich the records before sending them to the destination.

The system diagram 300 may support a fast and efficient mechanism for synchronizing the latest changes in bulk from any number of metadata sources. The system diagram 300 may also support techniques for detecting backlogs in real-time CDC streams and recovering or otherwise resolving these backlogs by invoking the asynchronous metadata service 225. The metadata synchronization techniques described herein, including with reference to FIG. 3, may help with initializing new data sources and propagating data additions, updates, and deletions. Aspects of the present disclosure may also support filtering and enrichment of data by sources before the data is pushed to the destination, as shown and described with reference to FIGS. 4 through 6. The techniques described herein may also support parallel consumption of asynchronous and NRT streams.

The system diagram 300 illustrates an example of a bulk-push metadata synchronization process between a source and a destination. Multiple sources can be supported for a single destination. The asynchronous metadata service 225 may use queries (such as SQL statements) to directly access the source database 230 and to track changes in metadata tables since a given time r. Each data record may be published to the destination and stored in the destination database 235. The destination can provide the source with configuration information, such as when to start/stop pushing replay data, or any filtering and enrichment to be done to the data. The replay stream can use the same configurations as the CDC stream to maintain compatibility of data across both streams.

A data source can become backlogged due to a number of reasons such as slow processing at the destination, a sudden spike in source data, maintenance at the destination, slow processing at the source, a disconnection between the source and the destination, or other stream-specific reasons (e.g., if a stream has an unsupported rate of updates). If a data source is delayed in pushing updates, this can be detected at the destination using "checkpoints". The CDC service 240 may send a checkpoint for a "table range" every interval (e.g., 10 secs), indicating that all data up to a point in time has been sent for that table range. A table may be distributed into multiple table ranges depending on the database structure, and each range may publish a respective stream independently. Checkpoints may be sent regardless of whether records need to be published. The destination may keep track of all checkpoints consumed for different ranges in a table. If the latest checkpoint for any range exceeds a threshold (e.g., 5 mins), the destination may determine that the source is backlogged. If a backlog is detected at the source, the destination can trigger a "Replay" stream to recover from the backlog. Replay (i.e., the asynchronous metadata service 225) can help the destination catch up with the backlog by publishing rows directly from the source database 230 (bypassing the CDC service 240)).

The asynchronous metadata service 225 may support backlog detection and recovery. For example, the asynchronous metadata service 225 may read the rows changed in data sources since a given time/by querying the data source and pushing the rows to the publisher. The application 310 may invoke the asynchronous metadata service 225 by transmitting a request (e.g., an API call) to the asynchronous metadata service 225. The request may optionally include a time-based filter, or the asynchronous metadata service 225 can replay (i.e., parse, process) all rows of a given table. The replay records 330 from the asynchronous metadata service 225 and CDC records 335 from the CDC service 240 may be directed through the same pipeline for data filtering and enrichment used in NRT CDC streams.

One advantage of triggering a replay stream is that the replay stream can push the latest version of rows, and skip or otherwise discard intermediate versions of the rows. Thus, asynchronous replay streams can be consumed faster by the destination (in comparison to CDC streams). When a replay stream is triggered, the asynchronous metadata service 225 can discard older CDC records 335 and restart the stream from current point in time. The CDC stream may be started before the replay stream to ensure no data is missed.

The system diagram 300 may support data source initialization using Replay. When a data source (such as the application 305) connects to a destination (such as the application 310) for the first time, the new data source may have a relatively large amount of data to be pushed/published. Synchronizing all versions of all rows may overload the destination. In such cases, the asynchronous metadata service 225 can be used to synchronize/push the latest version of source data in bulk, after which a CDC stream can begin.

As described herein, separate queues may be configured at the destination for replay records 330 and CDC records 335. For example, the queue 270 may include the replay records 330, while the queue 275 may include the CDC records 335. Each queue may have a corresponding set of workers to manage the throughput of replay streams and CDC streams separately. Replay queues (such as the queue 270) can further be sharded by data sources to independently control the rate of processing for different data sources. There may be consumer workers monitoring each replay queue responsible for storing updates in the destination database 235. The number of workers for a given queue can be configurable to provide higher or lower priority for data sources.

Each row in the source may have an update timestamp from the source. Each row in the queue 270 may be iterated over, and checks may be performed to determine if a row needs to be updated in the destination. For each row in the queue 270, if the row is absent from the destination, the row may be inserted. If the row is present in the destination, the row may be updated if the update time of the row is newer than that of the destination.

In accordance with the techniques described herein, the data enrichment service 250 may receive, from the application 310 in the destination computing environment 210, a set of enrichment definitions 315 for metadata synchronization between the application 310 and the application 305 in the source computing environment 205. The CDC service 240 may provide, to the data enrichment service 250, a set of CDC records 335 corresponding to metadata changes associated with the application 305. Accordingly, the data enrichment service 250 may transform the set of CDC records 335 by using a set of data enrichment components to modify the set of CDC records 335 according to the set of enrichment definitions 315 provided by the application 310, where the set of data enrichment components are dynamically partitioned into enrichment groups that execute in parallel. The application 305 may push the transformed CDC records 335 to the application 310 via a real-time CDC stream.

Figure 4:
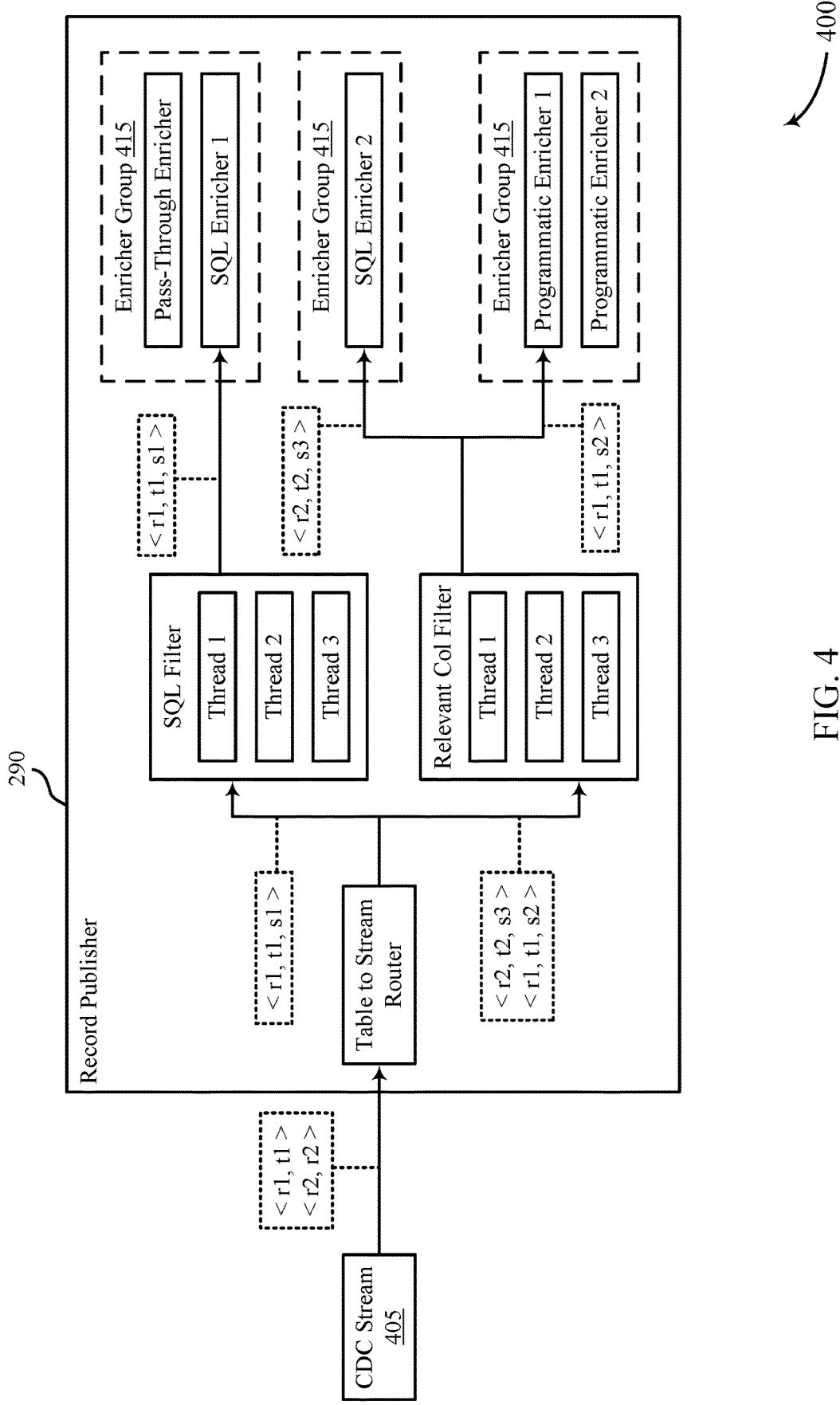
FIG. 4 shows an example of an enrichment scheme that supports techniques for source-side metadata enrichment in accordance with aspects of the present disclosure.

FIG. 4 shows an example of an enrichment scheme 400 that supports techniques for source-side metadata enrichment in accordance with aspects of the present disclosure. The enrichment scheme 400 may implement or be implemented by aspects of any of the computing environments or system diagrams shown and described with reference to FIGS. 1 through 3. For example, the enrichment scheme 400 includes a record publisher 290, which may be an example of a logical and/or physical sub-system of the DMS 110, as shown and described with reference to FIG. 1. In the enrichment scheme 400, the record publisher 290 may dynamically partition various enrichers (also referred to herein as data enrichment components or modules) into enricher groups 415.

Aspects of the present disclosure support a push-based approach to synchronize metadata between applications running across data centers or cloud environments. In such a model, applications may have to transform data records from CDC stream(s), and doing so at the source application (such as the application 305 described with reference to FIG.

3) may be advantageous in some implementations. The techniques described herein provide for transforming (i.e., enriching) data records at the source-side.

For metadata synchronization, the receiver application (such as the application 310 described with reference to FIG. 3) may process metadata from the source application in a form that is different from the form in which the metadata is stored internally by the source application. For example, a source application may store metadata across two tables, but may present (i.e., to the receiver application) a view of metadata that involves joining metadata from these two tables.

Several different approaches to push-based data transformation (i.e., enrichment) are contemplated herein. In some implementations, the source application may push the data from a database (such as the source database 230), without changes, using CDC capabilities exposed by the database. The receiver application (also referred to herein as the destination application) may receive this data and request additional data from the source application (either via an API call or some other mechanism) to create a view that is compatible with the receiver application. In other implementations, the source application may push all data that is used to create a particular view at the receiver application from the database as-is, and the receiver application may perform any necessary transformation(s). For example, if a particular view involves joining data from two tables, records from both tables can be pushed independently, and the receiver application can replicate source-side logic to join (i.e., merge, combine) the data. Alternatively, CDC data can be transformed at the source-side before the CDC data is pushed to the receiver application. This type of enrichment may involve converting the CDC data into a form that can be consumed by the receiver application(s).

Having the receiver application request auxiliary (e.g., supplemental) data from the source application may involve additional communications between the receiver and source applications when additional data is needed to create a particular view. This approach may also result in higher latency due to additional network calls. Further, implementing this approach at the receiver application may involve higher complexity due to the tight coupling with the source application logic and the additional calls needed to create the final view. In addition, this approach may result in data consistency issues, as data events may be stale (i.e., outdated) by the time additional data arrives from the source, resulting in compatibility issues.

Having the source application provide all necessary data (i.e., all data that is used to create a particular view at the receiver application) in its original form may also create data consistency issues. For example, two data records received from two different tables may be inconsistent with each other (e.g., for out-of-order consumption). These data consistency issues can, in some scenarios, be solved by reading data records from two tables starting from a point that is consistent across the two tables. However, implementing such logic may add substantial delays. Additionally, the receiver application may be unable to perform/execute some transformations (such as programmatic enrichments) that are typically done at the source-side.

Transforming (i.e., enriching) data records at the source application may help mitigate the aforementioned issues. The innovative techniques described herein may leverage source-side enrichment to provide a consistent view of data to the receiver application, regardless of when the receiver application consumes the data. Source-side metadata enrichment simplifies the implementation of receiver application(s) by abstracting source-side logic into a declarative format. The flexible enrichment framework disclosed herein may enable the receiver application to onboard new use-cases without having to re-deploy or upgrade the source application. The techniques described herein may also support isolation across different use-cases of receiver application(s), and may reduce the quantity of data records that are pushed to the receiver (e.g., by deduplicating them at the source).

As described herein, the process of enriching a data record with additional data is referred to as "Enrichment", and the modules/components that perform these enrichments are referred to as Enrichers. Many different types of enrichments are contemplated herein, and the determination as to which enrichment to use in a particular scenario may be handled by the receiver application.

Examples of enrichment types include projection enrichments, SQL enrichments, and programmatic enrichments. However, other enrichment types are not precluded. Projection enrichments refer to enrichments where specific fields of a CDC record are retained and pushed to the receiver. SQL enrichments involve enriching CDC data via a SQL query configured by the receiver application. Programmatic enrichments can be used to enrich CDC records when the desired enrichment logic cannot be represented as a SQL query. These enrichers can be implemented using services that are accessible over API/RPC. The source application may expose a repertoire of programmatic enrichments that can be used by the receiver application. Alternatively, programmatic enrichment modules can be provided by the receiver application and dynamically injected into the source application for specific use cases. Dynamic injection may enable some use-cases of the receiver application to onboard without upgrades to the source application.

For implementations where the receiver application needs additional metadata from the source application, the receiver application can register enrichment definitions (such as the enrichment definitions 315 described with reference to FIG. 3) with the source application. One of the details (i.e., parameters) in these definitions may be the type of enrichment to use. These enrichment definitions can be declarative, with a structure that can apply to a wide variety of use-cases on the receiver-side. Using the enrichment definitions provided by the receiver application, the source application can capture CDC data, apply the specified enrichment, and push the resulting data to the receiver application. For example, the source application may enrich a CDC record from a "job_instance" table by applying a SQL query to the CDC record, thereby transforming the CDC record into "JobProgress" data that can be pushed to the receiver application.

Using declarative enrichment definitions may reduce the complexity of implementations at the receiver application, as the receiver application may not have to convert "job_instance" entries to "JobProgress" in code. Furthermore, the definition format(s) disclosed herein are flexible enough to accommodate a wide range of use-cases across different tables, thereby alleviating the need for the source application to redeploy/upgrade for each use-case. Also, since the enrichment logic executes on the source application, database transactions can be leveraged to create a consistent view of data.

Different enrichments may have different latencies. As a result, slower enrichments can cause delays if all CDC records are handled by a single queue. Moreover, external failures (e.g. due to programmatic enrichment services going down) can cause further delays and/or backlogs at the source application. To mitigate such issues, the source application may be configured to use rate limiting mechanisms and/or other recovery mechanisms described herein.

Slower enrichments may impact other metadata synchronization processes at the source application. As such, maintaining some level of isolation between different enrichers may improve the performance of such processes. To provide sufficient isolation, the source application may use multiple enricher groups 415, where each enricher group 415 includes enrichers with similar processing time(s). The mapping or assignment of Enrichers to Enricher Groups can be adaptive (i.e. based on the average processing time observed), such that Enrichers can be moved to different enricher groups 415 over time.

For example, there may be two enricher groups 415: an Express group associated with a first latency range and a non-Express group associated with a second latency range. The Express group may be the starting enricher group for all enrichers, and may eventually include enrichers with lower enrichment times (i.e., less than 10 ms). Enrichers with an average enrichment time higher than 10 ms may reside in the other group. All enricher groups 415 may run concurrently, and may provide isolation between one set of enrichers (i.e., enrichers that are experiencing delays) and another set of enrichers with faster processing time(s). Using more enricher groups 415 may provide greater isolation, but may also result in higher system load. The optimal number of enricher groups 415 can be defined by node specifications. Using multiple enricher groups 415 that run in parallel may result in out-of-order publishing of metadata. However, provided that each metadata event published is independent of the others, the order may be inconsequential.

The techniques described herein may also support batched processing of data records. In some implementations, the execution logic of an enricher group 415 may round-robin between Enrichers registered with it, and each Enricher (in one invocation) can handle a single data record or a set of data records. Programmatic enrichers can minimize the impact (i.e., overhead) of API/RPC calls to helper services by batching (i.e., merging, combining) requests for multiple records into a single call. Enrichers with pending records can be called to avoid delays in the enrichment layer. This round-robin handling may reduce the likelihood of heavy (i.e., more complex) Enrichers adversely affecting the performance of other enrichers.

Figure 5:
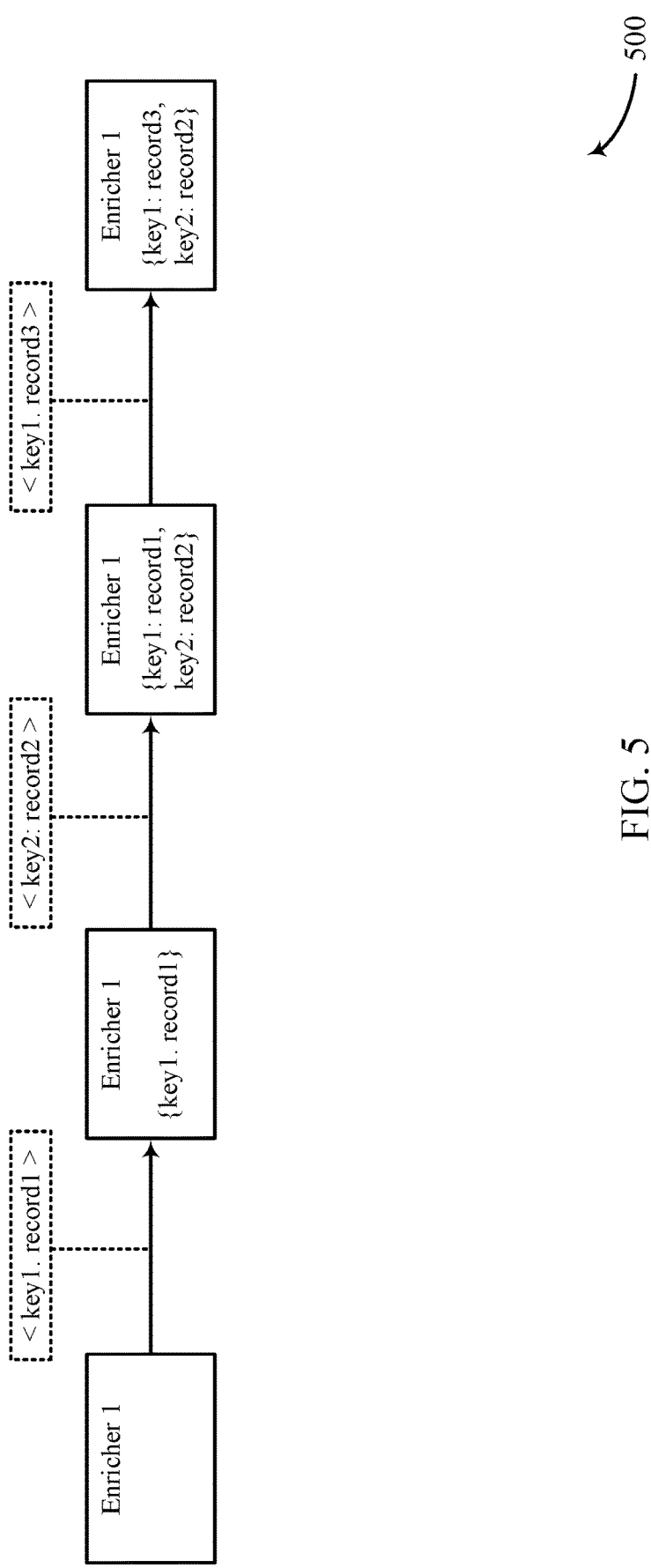
FIG. 5 shows an example of a deduplication scheme that supports techniques for source-side metadata enrichment in accordance with aspects of the present disclosure.

FIG. 5 shows an example of a deduplication scheme 500 that supports techniques for source-side metadata enrichment in accordance with aspects of the present disclosure. The deduplication scheme 500 may implement or be implemented by aspects of any of the computing environments, system diagrams, or enrichment schemes shown and described with reference to FIGS. 1 through 4. For example, one or more aspects of the deduplication scheme 500 may be implemented by the data enrichment service 250, as shown and described with reference to FIG. 2. In the deduplication scheme 500, a data enrichment component of the data enrichment service 250) (referred to hereinafter as Enricher 1) may drop an outdated (i.e., stale) record when a new record is received.

As described herein with reference to FIGS. 1 through 4, the DMS 110 may include various distributed nodes or node clusters that provide backup and recovery services for client systems. Some backup processes within the DMS 110 may involve exchanging metadata between applications running in different data centers or cloud environments. For example, the application 305 (running in the source computing environment 205) may push metadata to the application 310 (running in the destination computing environment 210) such that metadata is synchronized across the source (i.e., the application 305) and the destination (i.e., the application 310). The destination may use the metadata provided by the source to perform various tasks related to database backup, recovery, duplication, restoration, etc.

In some cases, to reduce the volume of data that is transferred from the source to the destination, the source may identify which rows (i.e., within a table that includes metadata associated with the source) have changed since the last exchange, and may push the changed rows to the destination in the form of data records that are processed and stored at the destination. If, however, the content or format of data records stored in the source computing environment differs from the content or format in which the destination expects to receive data records, the destination may be unable to properly ingest data records from the source. For example, the destination may need additional (i.e., auxiliary) data from the source to process a given data record, and this data may not be readily available to the destination.

Aspects of the present disclosure support techniques for using source-side data enrichment to maintain consistency across the source and the destination. Source-side enrichment generally refers to the process of filtering, modifying, and/or augmenting data records (such as the CDC records 335 described with reference to FIG. 3) at the source so the data records can be ingested (e.g., without additional processing) at the destination. Some forms of data enrichment (referred to hereinafter as projection enrichments) may involve retaining or discarding certain fields from a data record. Other forms of data enrichment (referred to hereinafter as SQL enrichments) may involve executing SQL queries configured by the destination.

Some other forms of data enrichment (referred to hereinafter as programmatic enrichments) may involve calling external services and systems via an API/RPC. The various data enrichment operations described herein may be performed by modules or components of the source (referred to hereinafter as enrichers or data enrichment components). Some forms of data enrichment (e.g., programmatic enrichments) may take longer to complete than other forms of data enrichment (e.g., projection enrichments). To account for differences in latency, enrichers with similar processing times may be dynamically partitioned into enricher groups 415 that run concurrently.

The techniques described herein support deduplication of CDC records within enricher queues. In some implementations, by assigning slower Enrichers to the same enricher group (as shown and described with reference to FIG. 4), these enrichers may accumulate more records in their queue(s) prior to execution. Thus, it may be possible for these enrichers to drop old (i.e., stale, outdated) versions of the same record from the queue, thereby reducing the number of enrichments that are performed. This deduping is not limited to records from the same table, as each Enricher may have access to the relationship(s) between tables from which these records were obtained. For instance, if there are joins (i.e., aggregations) of multiple tables, these enrichers may be able to dedupe records across tables as well. This concept is shown and described in the example of FIG. 5, where Enricher 1 drops an old record ("record1") associated with a particular key ("key 1") when a new record ("record3") for the key is received before Enricher 1 is able to push the event(s) from the queue to the receiver application.

Aspects of the present disclosure also support techniques for handling queue buildups at enrichers. In some implementations, each enricher instance may have a corresponding queue of records, to which new CDC records are appended. However, there may be a relatively large buildup within the queue (e.g., due to prolonged outages of helper services or slow enrichment processes). Both of these conditions may cause alerts to be surfaced and/or recovery mechanisms to be invoked. For example, if the number of CDC records in a queue surpasses a threshold, an Enricher may stop adding records to the queue, drain (e.g., remove) records from the queue to free up processing resources, and trigger a backlog recovery mechanism to recover from the queue buildup (e.g., by calling or invoking the asynchronous metadata service 225).

The described techniques may also support mechanisms for handling errors in helper services. In particular, a dedicated enricher group ("Deny ListGroup") may be configured for enrichers that fail during the enrichment process. As enricher groups run concurrently, if a particular enrichment fails (with retries) for an enricher, that Enricher may be moved (i.e., re-assigned) to the dedicated enricher group. Alerts may be surfaced when enrichers are moved to the dedicated enricher group. This enricher group may be responsible for periodically checking to determine whether the registered enricher(s) are passing (i.e., running successfully). When this occurs, the enricher(s) can be re-assigned to their previous enricher group(s). This ensures that failing (i.e., error-prone) enrichers do not adversely impact the performance of other enrichers.

Particular aspects of the subject matter shown and described with reference to FIG. 5 can be implemented to realize one or more of the following potential advantages. In some examples, by filtering and enriching data records at a source application (e.g., within the source computing environment 205), the described techniques may result in lower signaling overhead, reduced latency, fewer consistency issues, etc. For example, instead of pushing raw (i.e., untransformed) data records to the receiver application (e.g., in the destination computing environment 210) and having the receiver application request auxiliary data that it needs to process or otherwise ingest the data records, the source application may proactively enrich the data records according to a set of declarative enrichment definitions provided by the receiver application, thereby avoiding the latency and signaling overhead associated with transferring additional/auxiliary data to the receiver application.

Figure 6:
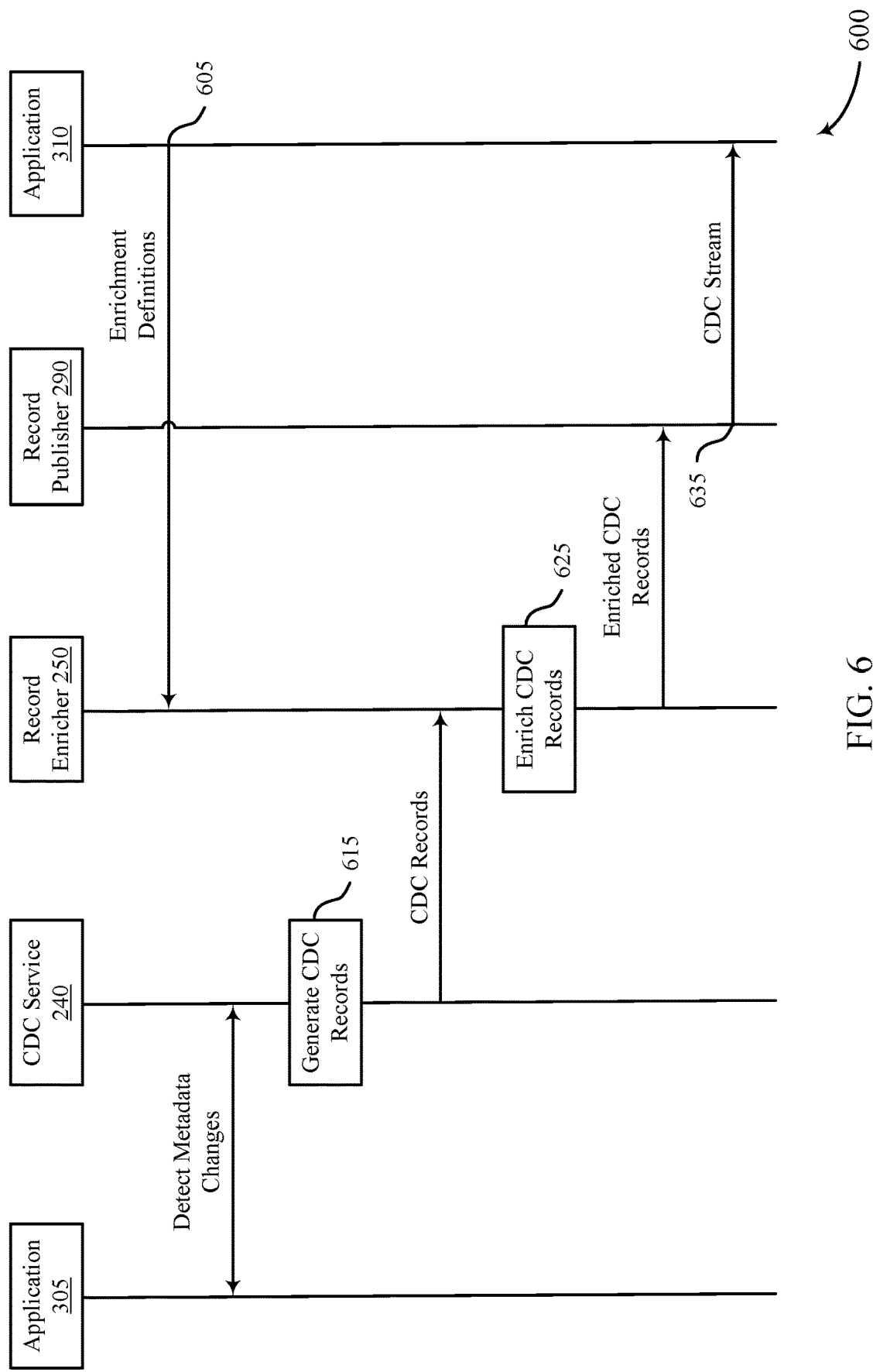
FIG. 6 shows an example of a process flow that supports techniques for source-side metadata enrichment in accordance with aspects of the present disclosure.

FIG. 6 shows an example of a process flow 600 that supports techniques for source-side metadata enrichment in accordance with aspects of the present disclosure. The process flow 600 may implement or be implemented by aspects of any of the computing environments, system diagrams, enrichment schemes, or deduplication schemes shown and described with reference to FIGS. 1 through 5. For example, the process flow 600 includes an application 305, a CDC service 240, a data enrichment service 250 (also referred to herein as a record enricher service), a record publisher 290, and an application 310, which may be examples of corresponding systems and services described herein. In the following description of the process flow 600, operations between the application 305, the CDC service 240, the data enrichment service 250, the record publisher 290, and the application 310 may be added, omitted, or performed in a different order (with respect to the exemplary order shown).

At 605, the data enrichment service 250 may receive, from the application 310 running in the destination computing environment 210, a set of enrichment definitions 315 for metadata synchronization between the application 310 in the destination computing environment 210 and the application 305 in the source computing environment 205 of the DMS 110. The set of enrichment definitions 315 may include a declarative enrichment definition that includes a data stream name, a source table name, an enricher type field, and an enricher name field, an enricher SQL field, a column selection field, or a combination thereof. In some implementations, one or more of the data stream name, the source table name, the enricher type field, the enricher name field, the enricher SQL field, or the column selection field may be omitted from the declarative enrichment definition.

At 615, the CDC service 240 may generate a set of CDC records 335 corresponding to metadata changes associated with the application 305 in the source computing environment 205. In some implementations, first metadata format in which the CDC records 335 are stored within the source computing environment 205 may differ from a second metadata format in which the CDC records 335 are processed or otherwise ingested within the destination computing environment 210.

At 625, the data enrichment service 250 may transform the set of CDC records 335 based on using a set of enrichers (i.e., data enrichment components) to modify the set of CDC records 335 according to the set of enrichment definitions 315 provided by the application 310 in the destination computing environment 210. The set of CDC records 335 may be enriched within the source computing environment 205 before the record publisher 290 pushes the CDC records 335 to the destination computing environment 210.

In some implementations, transforming the set of CDC records 335 includes merging CDC records 335 from two or more tables that contain metadata associated with the application 305. In some other implementations, transforming the set of CDC records 335 includes performing a projection enrichment of the CDC records 335 by selecting and retaining a subset of fields from the CDC records 335 and pushing the selected subset of fields to the application 310. Additionally, or alternatively, transforming the set of CDC records 335 may include performing a SQL enrichment of the CDC records 335 in accordance with a SQL query configured by the application 310. Transforming the set of CDC records 335 may also include performing a programmatic enrichment of the CDC records 335 by making one or more API calls or RPCs to auxiliary enrichment services. In some implementations, transforming the set of CDC records 335 includes executing a batch request for a programmatic enrichment of multiple CDC records 335 via a single API call or RPC.

As described herein, the set of enrichers may be dynamically partitioned into enricher groups 415 that execute concurrently (i.e., in parallel). In some implementations, the set of enrichers may be dynamically partitioned according to processing time. For example, the data enrichment service 250 may re-assign an enricher from one enricher group 415 to another enricher group 415 based on a processing time associated with the enricher, a change in processing time associated with the enricher, or both. In some implementations, a first enricher group 415 may be associated with a first latency range, and a second enricher group 415 may be associated with a second (i.e., different) latency range. Within a given enricher group 415, enrichers may be invoked (e.g., executed) according to a round-robin execution scheme in which each enricher processes one or more of the CDC records 335 per invocation.

Enrichers may be configured to maintain respective queues to which CDC records 335 are appended. In some implementations, transforming the set of CDC records 335 may include deduplicating one or more CDC records 335 in an enricher queue before the CDC records 335 are enriched. The deduplicated CDC records 335 may include metadata from one or multiple tables that contain metadata associated with the application 305. In some implementations, if a quantity of CDC records 335 in an enricher queue surpasses a threshold, the data enrichment service 250 may invoke the asynchronous metadata service 225 to perform a backlog recovery process on the enricher queue.

At 635, the record publisher 290 may push (i.e., publish) the set of transformed CDC records 335 to the application 310 via a CDC stream 405 (e.g., a real-time data stream) between the application 305 and the application 310. By filtering and enriching the CDC records 335 within the source computing environment 205, the techniques described herein may result in lower signaling overhead, reduced latency, fewer consistency issues, etc. For example, instead of pushing raw (i.e., untransformed) CDC records 335 to the application 310 and having the application 310 request auxiliary data that it needs to process or otherwise ingest the CDC records 335, the data enrichment service 250 may proactively enrich the CDC records 335 according to the set of enrichment definitions 315 provided by the application 310, thereby avoiding the latency and signaling overhead associated with transferring additional/auxiliary data to the application 310.

Figure 7:
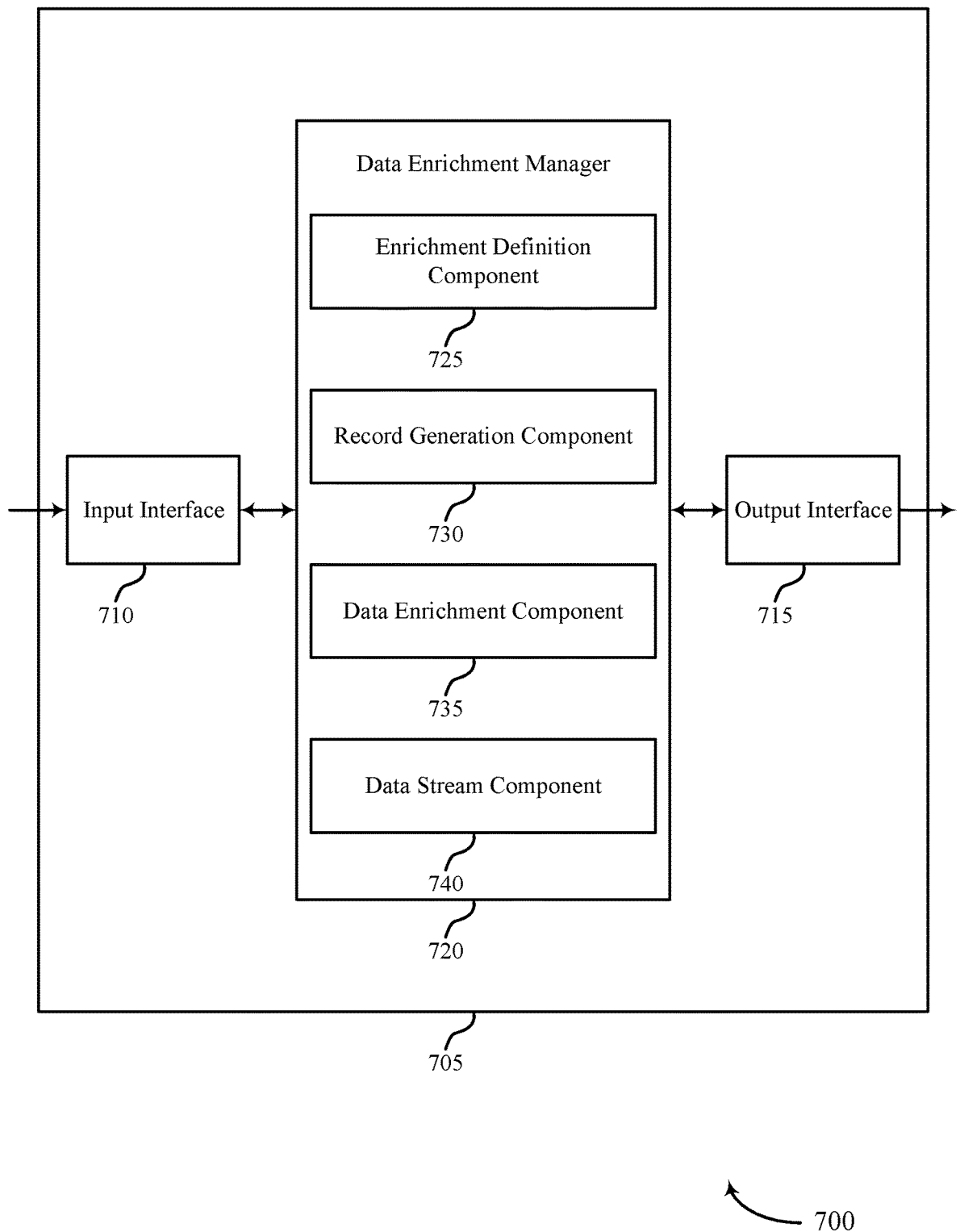
FIG. 7 shows a block diagram of an apparatus that supports techniques for source-side metadata enrichment in accordance with aspects of the present disclosure.

FIG. 7 shows a block diagram 700 of a system 705 that supports techniques for source-side metadata enrichment in accordance with aspects of the present disclosure. In some examples, the system 705 may be an example of aspects of one or more components described with reference to FIG. 1, such as a DMS 110. The system 705 may include an input interface 710, an output interface 715, and a data enrichment manager 720. The system 705 may also include one or more processors. Each of these components may be in communication with one another (e.g., via one or more buses, communications links, communications interfaces, or any combination thereof).

The input interface 710 may manage input signaling for the system 705. For example, the input interface 710 may receive input signaling (e.g., messages, packets, data, instructions, commands, or any other form of encoded information) from other systems or devices. The input interface 710 may send signaling corresponding to (e.g., representative of or otherwise based on) such input signaling to other components of the system 705 for processing. For example, the input interface 710) may transmit such corresponding signaling to the data enrichment manager 720 to support techniques for source-side metadata enrichment. In some cases, the input interface 710 may be a component of a network interface 925 as described with reference to FIG. 9.

The output interface 715 may manage output signaling for the system 705. For example, the output interface 715 may receive signaling from other components of the system 705, such as the data enrichment manager 720), and may transmit such output signaling corresponding to (e.g., representative of or otherwise based on) such signaling to other systems or devices. In some cases, the output interface 715 may be a component of a network interface 925 as described with reference to FIG. 9.

For example, the data enrichment manager 720 may include an enrichment definition component 725, a record generation component 730, a data enrichment component 735, a data stream component 740), or any combination thereof. In some examples, the data enrichment manager 720, or various components thereof, may be configured to perform various operations (e.g., receiving, monitoring, transmitting) using or otherwise in cooperation with the input interface 710, the output interface 715, or both. For example, the data enrichment manager 720 may receive information from the input interface 710, send information to the output interface 715, or be integrated in combination with the input interface 710, the output interface 715, or both to receive information, transmit information, or perform various other operations as described herein.

The data enrichment manager 720 may support data management in accordance with examples disclosed herein. The enrichment definition component 725 may be configured as or otherwise support a means for receiving, from a first application in a destination computing environment of a DMS, a set of enrichment definitions for metadata synchronization between the first application in the destination computing environment and a second application in a source computing environment of the DMS. The record generation component 730) may be configured as or otherwise support a means for generating a set of data records corresponding to metadata changes associated with the second application in the source computing environment. The data enrichment component 735 may be configured as or otherwise support a means for transforming the set of data records based on using a set of data enrichment components to modify the set of data records according to the set of enrichment definitions provided by the first application in the destination computing environment, where the set of data enrichment components are dynamically partitioned into enrichment groups that execute in parallel. The data stream component 740 may be configured as or otherwise support a means for transmitting, via one or more data streams between the first application and the second application, at least a subset of the set of data records transformed by the set of data enrichment components.

Figure 8:
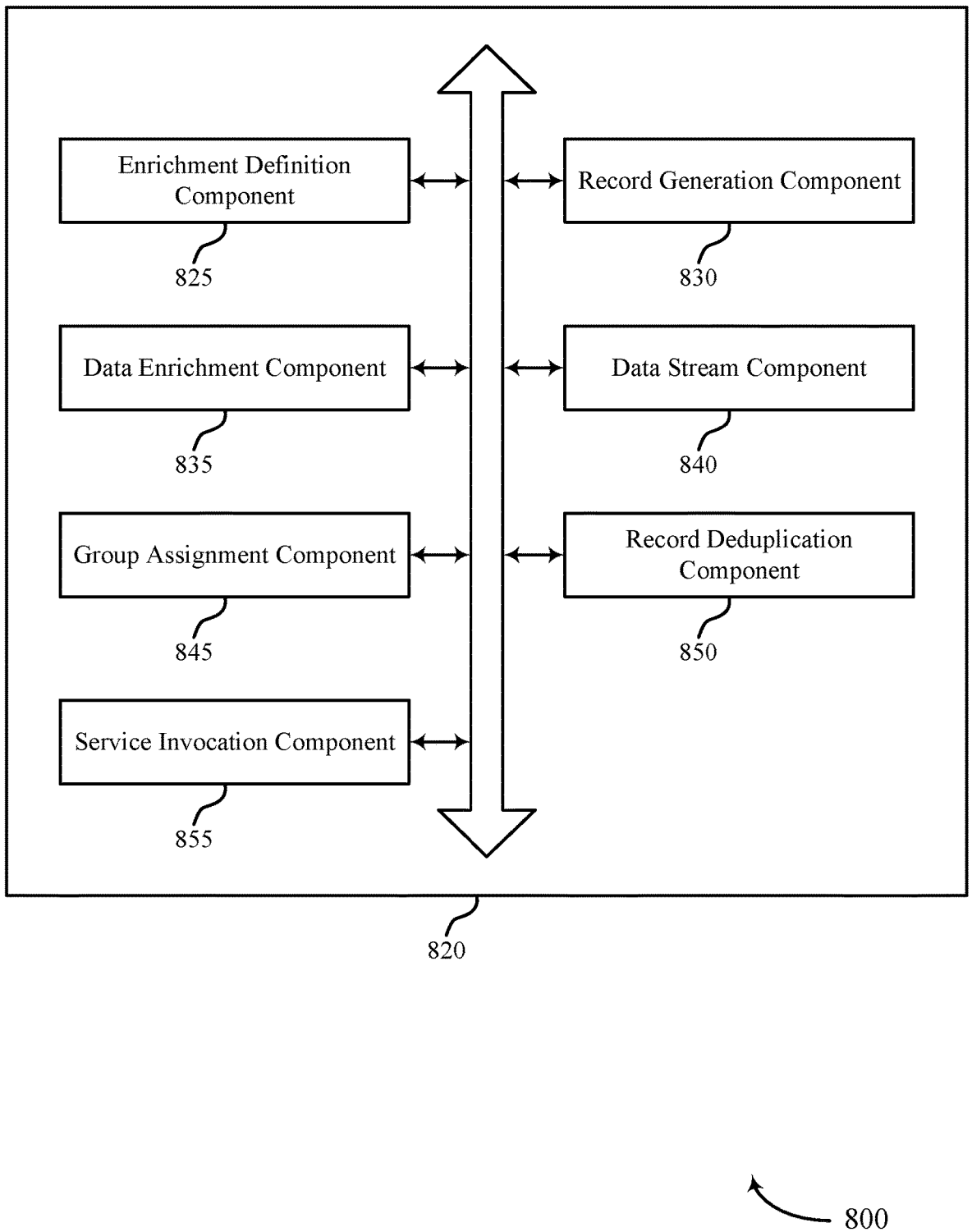
FIG. 8 shows a block diagram of a data enrichment manager that supports techniques for source-side metadata enrichment in accordance with aspects of the present disclosure.

FIG. 8 shows a block diagram 800 of a data enrichment manager 820 that supports techniques for source-side metadata enrichment in accordance with aspects of the present disclosure. The data enrichment manager 820 may be an example of aspects of a data enrichment manager or a data enrichment manager 720, or both, as described herein. The data enrichment manager 820, or various components thereof, may be an example of means for performing various aspects of techniques for source-side metadata enrichment as described herein. For example, the data enrichment manager 820 may include an enrichment definition component 825, a record generation component 830, a data enrichment component 835, a data stream component 840, a group assignment component 845, a record deduplication component 850, a service invocation component 855, or any combination thereof. Each of these components may communicate, directly or indirectly, with one another (e.g., via one or more buses, communications links, communications interfaces, or any combination thereof).

The data enrichment manager 820 may support data management in accordance with examples disclosed herein. The enrichment definition component 825 may be configured as or otherwise support a means for receiving, from a first application in a destination computing environment of a DMS, a set of enrichment definitions for metadata synchronization between the first application in the destination computing environment and a second application in a source computing environment of the DMS. The record generation component 830 may be configured as or otherwise support a means for generating a set of data records corresponding to metadata changes associated with the second application in the source computing environment. The data enrichment component 835 may be configured as or otherwise support a means for transforming the set of data records based on using a set of data enrichment components to modify the set of data records according to the set of enrichment definitions provided by the first application in the destination computing environment, where the set of data enrichment components are dynamically partitioned into enrichment groups that execute in parallel. The data stream component 840 may be configured as or otherwise support a means for transmitting, via one or more data streams between the first application and the second application, at least a subset of the set of data records transformed by the set of data enrichment components.

In some examples, the subset of the set of data records are enriched in the source computing environment before being pushed to first application in the destination computing environment.

In some examples, a first metadata format in which data records are stored in the source computing environment differs from a second metadata format in which data records are processed in the destination computing environment.

In some examples, to support transforming the set of data records, the data enrichment component 835 may be configured as or otherwise support a means for merging the set of data records from two or more tables that include metadata associated with the second application in the source computing environment.

In some examples, to support transforming the set of data records, the data enrichment component 835 may be configured as or otherwise support a means for performing a projection enrichment of a data record based on selecting a subset of fields of the data record to retain and push to the first application in the destination computing environment.

In some examples, to support transforming the set of data records, the data enrichment component 835 may be configured as or otherwise support a means for performing a SQL enrichment of a data record in accordance with a SQL query configured by the first application in the destination computing environment.

In some examples, to support transforming the set of data records, the data enrichment component 835 may be configured as or otherwise support a means for performing a programmatic enrichment of a data record based on making one or more API calls or RPCs to auxiliary enrichment services.

In some examples, the data enrichment component 835 may be configured as or otherwise support a means for exposing, to the first application in the destination computing environment, a set of programmatic enrichments supported by the second application in the source computing environment.

In some examples, programmatic enrichment modules are dynamically injected from the first application into the second application, thereby enabling the second application to use the programmatic enrichment modules without software updates.

In some examples, the set of enrichment definitions includes a declarative enrichment definition that includes a data stream name, a source table name, an enricher type field, and an enricher name field, an enricher SQL field, a column selection field, or a combination thereof. In some examples, the set of data enrichment components are dynamically partitioned according to processing time.

In some examples, the group assignment component 845 may be configured as or otherwise support a means for re-assigning a data enrichment component from a first enrichment group to a second enrichment group based on a change in processing time associated with the data enrichment component, where the first enrichment group is associated with a first latency range and the second enrichment group is associated with a second latency range.

In some examples, data enrichment components within an enrichment group are invoked using round-robin execution logic in which each data enrichment component processes one or more data records per invocation.

In some examples, executing a batch request for programmatic enrichment of at least two data records via a single API call or RPC. In some examples, the set of data enrichment components maintain respective queues to which data records are appended.

In some examples, the record deduplication component 850 may be configured as or otherwise support a means for deduplicating a set of data records in a queue of a data enrichment component before the set of data records are enriched, where the set of data records correspond to one or multiple tables including metadata associated with the second application.

In some examples, the service invocation component 855 may be configured as or otherwise support a means for transmitting an API call to an asynchronous metadata service supported by the DMS if a quantity of data records in a queue of a data enrichment component exceeds a threshold, where the API call is configured to cause the asynchronous metadata service to perform a backlog recovery process on the queue.

In some examples, the group assignment component 845 may be configured as or otherwise support a means for transferring a data enrichment component to another enrichment group based on a quantity of failures or errors thrown by the data enrichment component.

Figure 9:
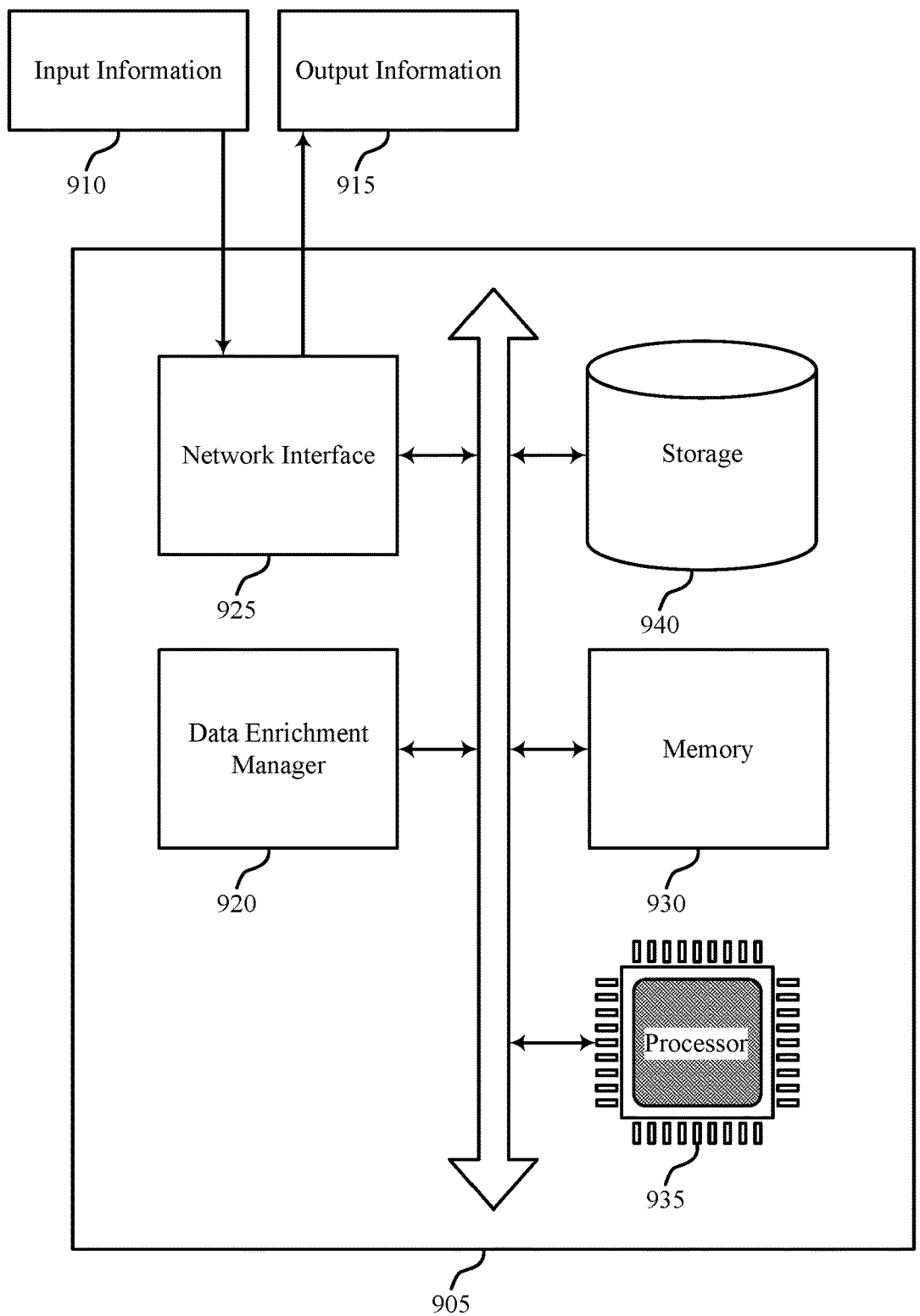
FIG. 9 shows a diagram of a system including a device that supports techniques for source-side metadata enrichment in accordance with aspects of the present disclosure.

FIG. 9 shows a block diagram 900 of a system 905 that supports techniques for source-side metadata enrichment in accordance with aspects of the present disclosure. The system 905 may be an example of or include the components of a system 705 as described herein. The system 905 may include components for data management, including components such as a data enrichment manager 920, an input information 910, an output information 915, a network interface 925, at least one memory 930, at least one processor 935, and a storage 940. These components may be in electronic communication or otherwise coupled with each other (e.g., operatively, communicatively, functionally, electronically, electrically: via one or more buses, communications links, communications interfaces, or any combination thereof). Additionally, the components of the system 905 may include corresponding physical components or may be implemented as corresponding virtual components (e.g., components of one or more virtual machines). In some examples, the system 905 may be an example of aspects of one or more components described with reference to FIG. 1, such as a DMS 110.

The network interface 925 may enable the system 905 to exchange information (e.g., input information 910, output information 915, or both) with other systems or devices (not shown). For example, the network interface 925 may enable the system 905 to connect to a network (e.g., a network 120 as described herein). The network interface 925 may include one or more wireless network interfaces, one or more wired network interfaces, or any combination thereof. In some examples, the network interface 925 may be an example of may be an example of aspects of one or more components described with reference to FIG. 1, such as one or more network interfaces 165.

Memory 930 may include RAM, ROM, or both. The memory 930 may store computer-readable, computer-executable software including instructions that, when executed, cause the at least one processor 935 to perform various functions described herein. In some cases, the memory 930 may contain, among other things, a basic input/output system (BIOS), which may control basic hardware or software operation such as the interaction with peripheral components or devices. In some cases, the memory 930 may be an example of aspects of one or more components described with reference to FIG. 1, such as one or more memories 175.

The at least one processor 935 may include an intelligent hardware device, (e.g., a general-purpose processor, a digital signal processor (DSP), a CPU, a microcontroller, an application-specific integrated circuit (ASIC), a field programmable gate array (FPGA), a programmable logic device, a discrete gate or transistor logic component, a discrete hardware component, or any combination thereof). The at least one processor 935 may be configured to execute computer-readable instructions stored in at least one memory 930 to perform various functions (e.g., functions or tasks supporting techniques for source-side metadata enrichment). Though a single processor 935 is depicted in the example of FIG. 9, it is to be understood that the system 905 may include any quantity of one or more of processors 935 and that a group of processors 935 may collectively perform one or more functions ascribed herein to at least one processor, such as the at least one processor 935. In some cases, the at least one processor 935 may be an example of aspects of one or more components described with reference to FIG. 1, such as one or more processors 170.

Storage 940 may be configured to store data that is generated, processed, stored, or otherwise used by the system 905. In some cases, the storage 940 may include one or more HDDs, one or more SSDs, or both. In some examples, the storage 940 may be an example of a single database, a distributed database, multiple distributed databases, a data store, a data lake, or an emergency backup database. In some examples, the storage 940 may be an example of one or more components described with reference to FIG. 1, such as one or more network disks 180.

The data enrichment manager 920 may support data management in accordance with examples disclosed herein. For example, the data enrichment manager 920 may be configured as or otherwise support a means for receiving, from a first application in a destination computing environment of a DMS, a set of enrichment definitions for metadata synchronization between the first application in the destination computing environment and a second application in a source computing environment of the DMS. The data enrichment manager 920 may be configured as or otherwise support a means for generating a set of data records corresponding to metadata changes associated with the second application in the source computing environment. The data enrichment manager 920 may be configured as or otherwise support a means for transforming the set of data records based on using a set of data enrichment components to modify the set of data records according to the set of enrichment definitions provided by the first application in the destination computing environment, where the set of data enrichment components are dynamically partitioned into enrichment groups that execute in parallel. The data enrichment manager 920 may be configured as or otherwise support a means for transmitting, via one or more data streams between the first application and the second application, at least a subset of the set of data records transformed by the set of data enrichment components.

By including or configuring the data enrichment manager 920 in accordance with examples as described herein, the system 905 may support techniques for techniques for source-side metadata enrichment, which may provide one or more benefits such as, for example, reduced latency, more efficient utilization of computing resources, improved scalability, and lower signaling overhead, among other possibilities.

Figure 10:
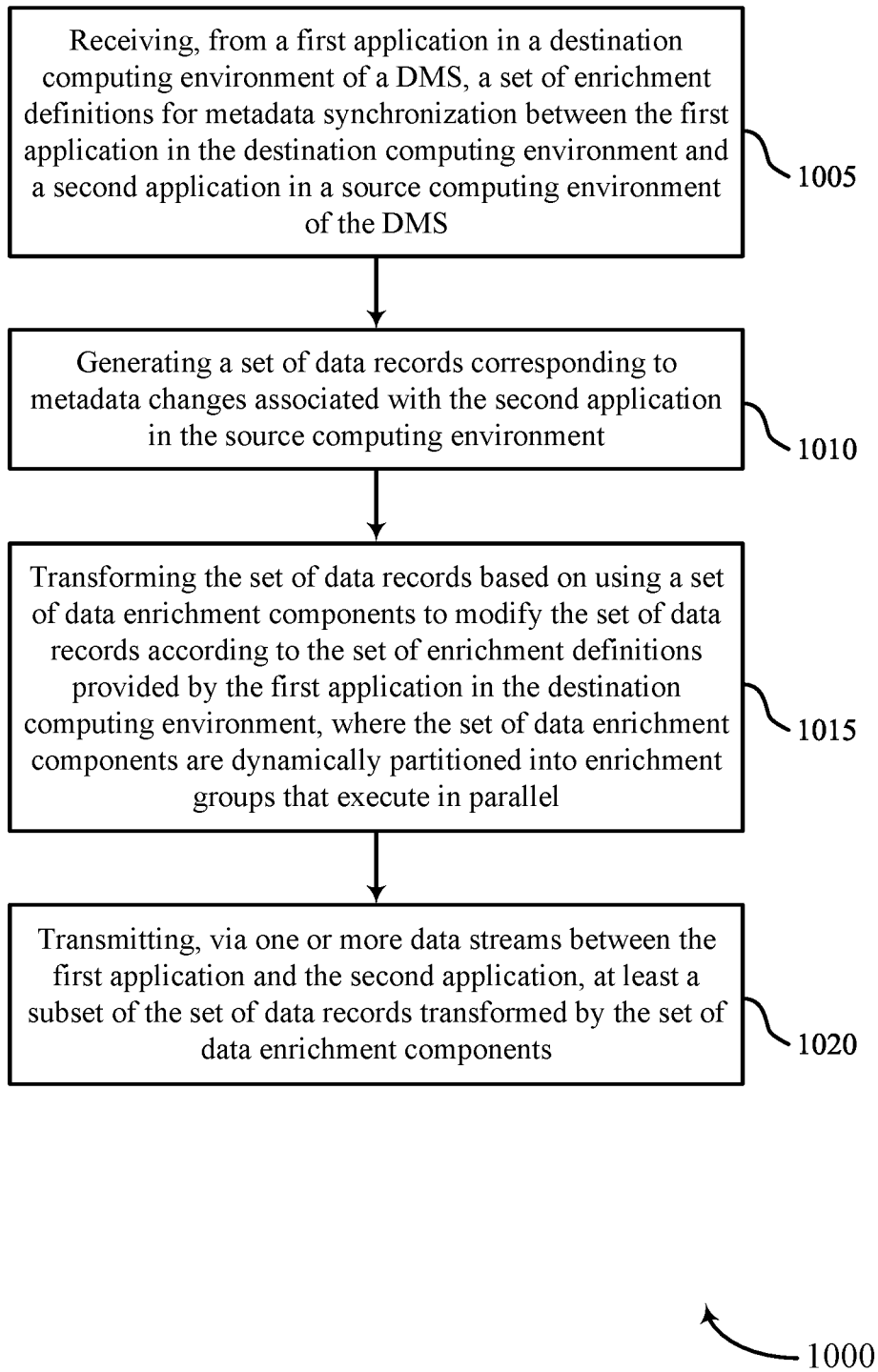
FIG. 10 shows a flowchart illustrating methods that support techniques for source-side metadata enrichment in accordance with aspects of the present disclosure.

FIG. 10 shows a flowchart illustrating a method 1000 that supports techniques for source-side metadata enrichment in accordance with aspects of the present disclosure. The operations of the method 1000 may be implemented by a DMS or components thereof, as described herein. For example, the operations of the method 1000 may be performed by the DMS 110, as shown and described with reference to FIG. 1. In some examples, the DMS may execute a set of instructions to control the functional elements of the DMS to perform the described functions. Additionally, or alternatively, the DMS may perform aspects of the described functions using special-purpose hardware.

At 1005, the method may include receiving, from a first application in a destination computing environment of a DMS, a set of enrichment definitions for metadata synchronization between the first application in the destination computing environment and a second application in a source computing environment of the DMS. The operations of 1005 may be performed in accordance with examples disclosed herein. In some examples, aspects of the operations of 1005 may be performed by an enrichment definition component 825, as described with reference to FIG. 8.

At 1010, the method may include generating a set of data records corresponding to metadata changes associated with the second application in the source computing environment. The operations of 1010 may be performed in accordance with examples disclosed herein. In some examples, aspects of the operations of 1010 may be performed by a record generation component 830, as described with reference to FIG. 8.

At 1015, the method may include transforming the set of data records based on using a set of data enrichment components to modify the set of data records according to the set of enrichment definitions provided by the first application in the destination computing environment, where the set of data enrichment components are dynamically partitioned into enrichment groups that execute in parallel. The operations of 1015 may be performed in accordance with examples disclosed herein. In some examples, aspects of the operations of 1015 may be performed by a data enrichment component 835, as described with reference to FIG. 8.

At 1020, the method may include transmitting, via one or more data streams between the first application and the second application, at least a subset of the set of data records transformed by the set of data enrichment components. The operations of 1020 may be performed in accordance with examples disclosed herein. In some examples, aspects of the operations of 1020 may be performed by a data stream component 840, as described with reference to FIG. 8.

A method for data management is described. The method may include receiving, from a first application in a destination computing environment of a DMS, a set of enrichment definitions for metadata synchronization between the first application in the destination computing environment and a second application in a source computing environment of the DMS. The method may further include generating a set of data records corresponding to metadata changes associated with the second application in the source computing environment. The method may further include transforming the set of data records based on using a set of data enrichment components to modify the set of data records according to the set of enrichment definitions provided by the first application in the destination computing environment, where the set of data enrichment components are dynamically partitioned into enrichment groups that execute in parallel. The method may further include transmitting, via one or more data streams between the first application and the second application, at least a subset of the set of data records transformed by the set of data enrichment components.

An apparatus for data management is described. The apparatus may include at least one processor, at least one memory coupled with the at least one processor, and instructions stored in the at least one memory. The instructions may be executable by the at least one processor to cause the apparatus to receive, from a first application in a destination computing environment of a DMS, a set of enrichment definitions for metadata synchronization between the first application in the destination computing environment and a second application in a source computing environment of the DMS. The instructions may be further executable by the at least one processor to cause the apparatus to generate a set of data records corresponding to metadata changes associated with the second application in the source computing environment. The instructions may be further executable by the at least one processor to cause the apparatus to transform the set of data records based on using a set of data enrichment components to modify the set of data records according to the set of enrichment definitions provided by the first application in the destination computing environment, where the set of data enrichment components are dynamically partitioned into enrichment groups that execute in parallel. The instructions may be further executable by the at least one processor to cause the apparatus to transmit, via one or more data streams between the first application and the second application, at least a subset of the set of data records transformed by the set of data enrichment components.

Another apparatus for data management is described. The apparatus may include means for receiving, from a first application in a destination computing environment of a DMS, a set of enrichment definitions for metadata synchronization between the first application in the destination computing environment and a second application in a source computing environment of the DMS. The apparatus may further include means for generating a set of data records corresponding to metadata changes associated with the second application in the source computing environment. The apparatus may further include means for transforming the set of data records based on using a set of data enrichment components to modify the set of data records according to the set of enrichment definitions provided by the first application in the destination computing environment, where the set of data enrichment components are dynamically partitioned into enrichment groups that execute in parallel. The apparatus may further include means for transmitting, via one or more data streams between the first application and the second application, at least a subset of the set of data records transformed by the set of data enrichment components.

A non-transitory computer-readable medium storing code for data management is described. The code may include instructions executable by at least one processor to receive, from a first application in a destination computing environment of a DMS, a set of enrichment definitions for metadata synchronization between the first application in the destination computing environment and a second application in a source computing environment of the DMS. The instructions may be further executable by the at least one processor to generate a set of data records corresponding to metadata changes associated with the second application in the source computing environment. The instructions may be further executable by the at least one processor to transform the set of data records based on using a set of data enrichment components to modify the set of data records according to the set of enrichment definitions provided by the first application in the destination computing environment, where the set of data enrichment components are dynamically partitioned into enrichment groups that execute in parallel. The instructions may be further executable by the at least one processor to transmit, via one or more data streams between the first application and the second application, at least a subset of the set of data records transformed by the set of data enrichment components.

In some examples of the methods, apparatuses, and non-transitory computer-readable media described herein, the subset of the set of data records may be enriched in the source computing environment before being pushed to first application in the destination computing environment.

In some examples of the methods, apparatuses, and non-transitory computer-readable media described herein, a first metadata format in which data records are stored in the source computing environment may differ from a second metadata format in which data records are processed in the destination computing environment.

In some examples of the methods, apparatuses, and non-transitory computer-readable media described herein, transforming the set of data records may include operations, features, means, or instructions for merging the set of data records from two or more tables that include metadata associated with the second application in the source computing environment.

In some examples of the methods, apparatuses, and non-transitory computer-readable media described herein, transforming the set of data records may include operations, features, means, or instructions for performing a projection enrichment of a data record based on selecting a subset of fields of the data record to retain and push to the first application in the destination computing environment.

In some examples of the methods, apparatuses, and non-transitory computer-readable media described herein, transforming the set of data records may include operations, features, means, or instructions for performing a SQL enrichment of a data record in accordance with a SQL query configured by the first application in the destination computing environment.

In some examples of the methods, apparatuses, and non-transitory computer-readable media described herein, transforming the set of data records may include operations, features, means, or instructions for performing a programmatic enrichment of a data record based on making one or more API calls or RPCs to auxiliary enrichment services.

Some examples of the methods, apparatuses, and non-transitory computer-readable media described herein may further include operations, features, means, or instructions for exposing, to the first application in the destination computing environment, a set of programmatic enrichments supported by the second application in the source computing environment.

In some examples of the methods, apparatuses, and non-transitory computer-readable media described herein, programmatic enrichment modules may be dynamically injected from the first application into the second application, thereby enabling the second application to use the programmatic enrichment modules without software updates.

In some examples of the methods, apparatuses, and non-transitory computer-readable media described herein, the set of enrichment definitions includes a declarative enrichment definition that includes a data stream name, a source table name, an enricher type field, and an enricher name field, an enricher SQL field, a column selection field, or a combination thereof.

In some examples of the methods, apparatuses, and non-transitory computer-readable media described herein, the set of data enrichment components may be dynamically partitioned according to processing time. Some examples of the methods, apparatuses, and non-transitory computer-readable media described herein may further include operations, features, means, or instructions for re-assigning a data enrichment component from a first enrichment group to a second enrichment group based on a change in processing time associated with the data enrichment component, where the first enrichment group is associated with a first latency range and the second enrichment group is associated with a second latency range.

In some examples of the methods, apparatuses, and non-transitory computer-readable media described herein, data enrichment components within an enrichment group may be invoked using round-robin execution logic in which each data enrichment component processes one or more data records per invocation.

Some examples of the methods, apparatuses, and non-transitory computer-readable media described herein may further include operations, features, means, or instructions for executing a batch request for programmatic enrichment of at least two data records via a single API call or RPC.

In some examples of the methods, apparatuses, and non-transitory computer-readable media described herein, the set of data enrichment components may maintain respective queues to which data records are appended.

Some examples of the methods, apparatuses, and non-transitory computer-readable media described herein may further include operations, features, means, or instructions for deduplicating a set of data records in a queue of a data enrichment component before the set of data records are enriched, where the set of data records correspond to one or multiple tables including metadata associated with the second application.

Some examples of the methods, apparatuses, and non-transitory computer-readable media described herein may further include operations, features, means, or instructions for transmitting an API call to an asynchronous metadata service supported by the DMS if a quantity of data records in a queue of a data enrichment component exceeds a threshold, where the API call may be configured to cause the asynchronous metadata service to perform a backlog recovery process on the queue.

Some examples of the methods, apparatuses, and non-transitory computer-readable media described herein may further include operations, features, means, or instructions for transferring a data enrichment component to another enrichment group based on a quantity of failures or errors thrown by the data enrichment component.

The following provides an overview of aspects of the present disclosure:

Aspect 1: A method for data management, including: receiving, from a first application in a destination computing environment of a DMS, a set of enrichment definitions for metadata synchronization between the first application in the destination computing environment and a second application in a source computing environment of the DMS: generating a set of data records corresponding to metadata changes associated with the second application in the source computing environment: transforming the set of data records based on using a set of data enrichment components to modify the set of data records according to the set of enrichment definitions provided by the first application in the destination computing environment, where the set of data enrichment components are dynamically partitioned into enrichment groups that execute in parallel; and transmitting, via one or more data streams between the first application and the second application, at least a subset of the set of data records transformed by the set of data enrichment components.

Aspect 2: The method of aspect 1, where the subset of the set of data records are enriched in the source computing environment before being pushed to first application in the destination computing environment.

Aspect 3: The method of any of aspects 1 through 2, where a first metadata format in which data records are stored in the source computing environment differs from a second metadata format in which data records are processed in the destination computing environment.

Aspect 4: The method of any of aspects 1 through 3, where transforming the set of data records includes: merging the set of data records from two or more tables that include metadata associated with the second application in the source computing environment.

Aspect 5: The method of any of aspects 1 through 4, where transforming the set of data records includes: performing a projection enrichment of a data record based on selecting a subset of fields of the data record to retain and push to the first application in the destination computing environment.

Aspect 6: The method of any of aspects 1 through 5, where transforming the set of data records includes: performing a SQL enrichment of a data record in accordance with a SQL query configured by the first application in the destination computing environment.

Aspect 7: The method of any of aspects 1 through 6, where transforming the set of data records includes: performing a programmatic enrichment of a data record based on making one or more API calls or RPCs to auxiliary enrichment services.

Aspect 8: The method of any of aspects 1 through 7, further including: exposing, to the first application in the destination computing environment, a set of programmatic enrichments supported by the second application in the source computing environment.

Aspect 9: The method of any of aspects 1 through 8, where programmatic enrichment modules are dynamically injected from the first application into the second application, thereby enabling the second application to use the programmatic enrichment modules without software updates.

Aspect 10: The method of any of aspects 1 through 9, where the set of enrichment definitions includes a declarative enrichment definition that includes a data stream name, a source table name, an enricher type field, and an enricher name field, an enricher SQL field, a column selection field, or a combination thereof.

Aspect 11: The method of any of aspects 1 through 10, where the set of data enrichment components are dynamically partitioned according to processing time.

Aspect 12: The method of any of aspects 1 through 11, further including: re-assigning a data enrichment component from a first enrichment group to a second enrichment group based on a change in processing time associated with the data enrichment component, where the first enrichment group is associated with a first latency range and the second enrichment group is associated with a second latency range.

Aspect 13: The method of any of aspects 1 through 12, where data enrichment components within an enrichment group are invoked using round-robin execution logic in which each data enrichment component processes one or more data records per invocation.

Aspect 14: The method of any of aspects 1 through 13, where transforming the set of data records executing a batch request for programmatic enrichment of at least two data records via a single API call or RPC.

Aspect 15: The method of any of aspects 1 through 14, where the set of data enrichment components maintain respective queues to which data records are appended.

Aspect 16: The method of any of aspects 1 through 15, further including: deduplicating a set of data records in a queue of a data enrichment component before the set of data records are enriched, where the set of data records correspond to one or multiple tables including metadata associated with the second application.

Aspect 17: The method of any of aspects 1 through 16, further including: transmitting an API call to an asynchronous metadata service supported by the DMS if a quantity of data records in a queue of a data enrichment component exceeds a threshold, where the API call is configured to cause the asynchronous metadata service to perform a backlog recovery process on the queue.

Aspect 18: The method of any of aspects 1 through 17, further including: transferring a data enrichment component to another enrichment group based on a quantity of failures or errors thrown by the data enrichment component.

Aspect 19: An apparatus for data management, including: at least one processor; at least one memory coupled with the at least one processor; and instructions stored in the at least one memory, where the instructions are executable by the at least one processor to cause the apparatus to perform a method of any of aspects 1 through 18.

Aspect 20: An apparatus for data management, including: at least one means for performing a method of any of aspects 1 through 18.

Aspect 21: A non-transitory computer-readable medium storing code for data management, the code including instructions executable by at least one processor to perform a method of any of aspects 1 through 18.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary." used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, at least one processor may be any conventional processor, controller, microcontroller, or state machine. At least one processor may also be implemented as a combination of computing devices (e.g., a combination of a DSP and a microprocessor, multiple microprocessors, one or more microprocessors in conjunction with a DSP core, or any other such configuration).

Any functions or operations described herein as being capable of being performed by at least one processor may be performed by multiple processors that, individually or collectively, are capable of performing the described functions or operations. For example, the functions described herein may be performed by multiple processors, each tasked with at least a subset of the described functions, such that, collectively, the multiple processors perform all of the described functions. As such, the described functions can be performed by a single processor or a group of processors functioning together (i.e., collectively) to perform the described functions, where any one processor performs at least a subset of the described functions.

Any functions or operations described herein as being capable of being performed by a memory may be performed by multiple memories that, individually or collectively, are capable of performing the described functions or operations. For example, the functions described herein may be performed by multiple memories, each tasked with at least a subset of the described functions, such that, collectively, the multiple memories perform all of the described functions. As such, the described functions can be performed by a single memory or a group of memories functioning together (i.e., collectively) to perform the described functions, where any one memory performs at least a subset of the described functions.

The functions described herein may be implemented in hardware, software executed by at least one processor, firmware, or any combination thereof. If implemented in software executed by at least one processor, the functions may be stored on or transmitted over as one or more instructions or code on a computer-readable medium. Other examples and implementations are within the scope of the disclosure and appended claims. For example, due to the nature of software, functions described above can be implemented using software executed by at least one processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for data management, comprising:
   receiving, from a first application in a destination computing environment of a data management system, a set of enrichment definitions for metadata synchronization between the first application in the destination computing environment and a second application in a source computing environment of the data management system;
   generating a plurality of data records corresponding to metadata changes associated with the second application in the source computing environment;
   dynamically partitioning a plurality of data enrichment components into a plurality of enrichment groups based at least in part on respective latencies associated with the plurality of data enrichment components, wherein the plurality of data enrichment components are based at least in part on the set of enrichment definitions provided by the first application in the destination computing environment;
   executing the plurality of enrichment groups in parallel to transform the plurality of data records according to the set of enrichment definitions provided by the first application in the destination computing environment; and
   transmitting, via one or more data streams between the first application and the second application, at least a subset of the plurality of data records transformed by the plurality of data enrichment components.

2. The method of claim 1, wherein the subset of the plurality of data records are enriched in the source computing environment before being pushed to the first application in the destination computing environment.

3. The method of claim 1, wherein a first metadata format in which data records are stored in the source computing environment differs from a second metadata format in which data records are processed in the destination computing environment.

4. The method of claim 1, wherein transforming the plurality of data records comprises:
   merging the plurality of data records from two or more tables that include metadata associated with the second application in the source computing environment.

5. The method of claim 1, wherein transforming the plurality of data records comprises:
   performing a projection enrichment of a data record based at least in part on selecting a subset of fields of the data record to retain and push to the first application in the destination computing environment.

6. The method of claim 1, wherein transforming the plurality of data records comprises:
   performing a structured query language (SQL) enrichment of a data record in accordance with a SQL query configured by the first application in the destination computing environment.

7. The method of claim 1, wherein transforming the plurality of data records comprises:
performing a programmatic enrichment of a data record based at least in part on making one or more application programming interface (API) calls or remote procedure calls (RPCs) to auxiliary enrichment services.

8. The method of claim 1, further comprising:
exposing, to the first application in the destination computing environment, a plurality of programmatic enrichments supported by the second application in the source computing environment.

9. The method of claim 1, wherein programmatic enrichment modules are dynamically injected from the first application into the second application, thereby enabling the second application to use the programmatic enrichment modules without software updates.

10. The method of claim 1, wherein the set of enrichment definitions comprises a declarative enrichment definition that includes a data stream name, a source table name, an enricher type field, and an enricher name field, an enricher structured query language (SQL) field, a column selection field, or a combination thereof.

11. The method of claim 1, wherein the plurality of data enrichment components are dynamically partitioned according to processing time.

12. The method of claim 1, further comprising:
re-assigning a data enrichment component from a first enrichment group to a second enrichment group based at least in part on a change in processing time associated with the data enrichment component, wherein the first enrichment group is associated with a first latency range and the second enrichment group is associated with a second latency range.

13. The method of claim 1, wherein data enrichment components within an enrichment group are invoked using round-robin execution logic in which each data enrichment component processes one or more data records per invocation.

14. The method of claim 1, wherein transforming the plurality of data records comprises:
executing a batch request for programmatic enrichment of at least two data records via a single application programming interface (API) call or remote procedure call (RPC).

15. The method of claim 1, wherein the plurality of data enrichment components maintain respective queues to which data records are appended.

16. The method of claim 1, further comprising:
deduplicating a set of data records in a queue of a data enrichment component before the set of data records are enriched, wherein the set of data records correspond to one or multiple tables comprising metadata associated with the second application.

17. The method of claim 1, further comprising:
transmitting an application programming interface (API) call to an asynchronous metadata service supported by the data management system if a quantity of data records in a queue of a data enrichment component exceeds a threshold, wherein the API call is configured to cause the asynchronous metadata service to perform a backlog recovery process on the queue.

18. The method of claim 1, further comprising:
transferring a data enrichment component to another enrichment group based at least in part on a quantity of failures or errors thrown by the data enrichment component.

19. An apparatus for data management, comprising:
at least one processor;
at least one memory coupled with the at least one processor, and
instructions stored in the at least one memory and executable by the at least one processor to cause the apparatus to:
receive, from a first application in a destination computing environment of a data management system, a set of enrichment definitions for metadata synchronization between the first application in the destination computing environment and a second application in a source computing environment of the data management system;
generate a plurality of data records corresponding to metadata changes associated with the second application in the source computing environment;
dynamically partition a plurality of data enrichment components into a plurality of enrichment groups based at least in part on respective latencies associated with the plurality of data enrichment components, wherein the plurality of data enrichment components are based at least in part on the set of enrichment definitions provided by the first application in the destination computing environment;
execute the plurality of enrichment groups in parallel to transform the plurality of data records according to the set of enrichment definitions provided by the first application in the destination computing environment; and
transmit, via one or more data streams between the first application and the second application, at least a subset of the plurality of data records transformed by the plurality of data enrichment components.

20. A non-transitory computer-readable medium storing code for data management, the code comprising instructions executable by at least one processor to:
receive, from a first application in a destination computing environment of a data management system, a set of enrichment definitions for metadata synchronization between the first application in the destination computing environment and a second application in a source computing environment of the data management system;
generate a plurality of data records corresponding to metadata changes associated with the second application in the source computing environment;
dynamically partition a plurality of data enrichment components into a plurality of enrichment groups based at least in part on respective latencies associated with the plurality of data enrichment components, wherein the plurality of data enrichment components are based at least in part on the set of enrichment definitions provided by the first application in the destination computing environment;
execute the plurality of enrichment groups in parallel to transform the plurality of data records according to the set of enrichment definitions provided by the first application in the destination computing environment; and
transmit, via one or more data streams between the first application and the second application, at least a subset of the plurality of data records transformed by the plurality of data enrichment components.

* * * * *